United States Patent
Lim et al.

(10) Patent No.: US 10,893,479 B2
(45) Date of Patent: *Jan. 12, 2021

(54) METHOD AND USER EQUIPMENT FOR TRANSMITTING UPLINK SIGNAL AND PROSE SIGNAL

(71) Applicant: LG ELECTRONICS INC., Seoul (KR)

(72) Inventors: Suhwan Lim, Seoul (KR); Yoonoh Yang, Seoul (KR); Sangwook Lee, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/738,851

(22) Filed: Jan. 9, 2020

(65) Prior Publication Data

US 2020/0154361 A1      May 14, 2020

Related U.S. Application Data

(63) Continuation of application No. 15/758,716, filed as application No. PCT/KR2016/010260 on Sep. 12, 2016, now Pat. No. 10,575,257.

(Continued)

(51) Int. Cl.
*H04W 52/14*      (2009.01)
*H04W 52/38*      (2009.01)
(Continued)

(52) U.S. Cl.
CPC ......... *H04W 52/14* (2013.01); *H04W 52/146* (2013.01); *H04W 52/36* (2013.01);
(Continued)

(58) Field of Classification Search
CPC . H04W 52/146; H04W 52/367; H04W 52/14; H04W 52/383
(Continued)

(56) References Cited

U.S. PATENT DOCUMENTS 9,781,567 B2 * 10/2017 Yang .................... H04W 4/023
2013/0170414 A1    7/2013 Kwon
(Continued)

FOREIGN PATENT DOCUMENTS

| CN | 102742331 | 10/2012 |
| CN | 104272616 | 1/2015 |

(Continued)

OTHER PUBLICATIONS

Korean Intellectual Property Office Application No. 10-2018-7007738, Notice of Allowance dated Dec. 4, 2019, 6 pages.

(Continued)

*Primary Examiner* — John J Lee
(74) *Attorney, Agent, or Firm* — Lee Hong Degerman Kang Waimey

(57) ABSTRACT

One disclosure of the present specification provides a method for simultaneously transmitting, by user equipment (UE), a cellular uplink signal and a proximity service (ProSe) signal. The method may comprise a step of determining the total transmission power $P_{CMAX}$ of the cellular uplink signal and the ProSe signal. Here, the total transmission power $P_{CMAX}$ may satisfy $P_{CMAX\_L} \leq P_{CMAX} \leq P_{CMAX\_H}$. At this time, $P_{CMAX\_L}$ may be a lower limit value and $P_{CMAX\_H}$ may be an upper limit value. The cellular uplink signal is transmitted in a subframe n, the ProSe signal is transmitted in a subframe m, and subframe n may be considered as a reference subframe if subframe n and subframe m are time asynchronous.

10 Claims, 23 Drawing Sheets

Related U.S. Application Data

(60) Provisional application No. 62/220,246, filed on Sep. 18, 2015, provisional application No. 62/236,986, filed on Oct. 5, 2015.

(51) Int. Cl.
*H04W 52/36* (2009.01)
*H04W 72/04* (2009.01)

(52) U.S. Cl.
CPC ....... *H04W 52/367* (2013.01); *H04W 52/383* (2013.01); *H04W 72/0446* (2013.01)

(58) Field of Classification Search
USPC ....... 455/522, 69, 456.1, 41.2, 452.1, 456.3, 455/509
See application file for complete search history.

(56) References Cited

U.S. PATENT DOCUMENTS

| | | | |
|---|---|---|---|
| 2013/0178221 A1 | 7/2013 | Jung et al. | |
| 2014/0226504 A1 | 8/2014 | Tavildar et al. | |
| 2016/0073408 A1* | 3/2016 | Sartori | H04W 72/0453 370/329 |
| 2016/0174181 A1* | 6/2016 | Fujishiro | H04W 60/00 455/435.1 |
| 2017/0353932 A1* | 12/2017 | Sorrentino | H04W 52/367 |
| 2018/0249420 A1 | 8/2018 | Lim et al. | |

FOREIGN PATENT DOCUMENTS

| | | |
|---|---|---|
| CN | 104350790 | 2/2015 |
| KR | 1020130035964 | 4/2013 |
| KR | 10-2013-0121052 | 11/2013 |
| KR | 1020140127297 | 11/2014 |
| KR | 1020140140548 | 12/2014 |
| KR | 1020150027176 | 3/2015 |
| KR | 1020150043426 | 4/2015 |
| WO | 2015005633 | 1/2015 |
| WO | 2015065768 | 5/2015 |

OTHER PUBLICATIONS

European Patent Office Application Serial No. 16846834.6, Search Report dated Mar. 19, 2019, 7 pages.
PCT International Application No. PCT/KR2016/010258, International Search Report dated Nov. 30, 2016, 7 pages.
United States Patent and Trademark Office U.S. Appl. No. 15/758,716, Office Action dated Mar. 21, 2019, 15 pages.
PCT International Application No. PCT/KR2016/010260, International Search Report dated Dec. 2, 2016, 2 pages.
"3rd Generation Partnership Project; Technical Specification Group Radio Access Network; LTE Device to Device (D2D) Proximity Services (ProSe); User Equipment (UE) radio transmission and reception (Release 12)", 3GPP TR 36.877 V12.0.0, Mar. 2015, 39 pages.
"3rd Generation Partnership Project; Technical Specification Group Radio Access Network; Evolved Universal Terrestrial Radio Access (E-UTRA); Physical Channels and Modulation (Release 10)", Section 5, 3GPP TS 36.211 V10.4.0, Dec. 2011, 45 pages.
The State Intellectual Property Office of the People's Republic of China Application Serial No. 201680053957.X, Office Action dated Jun. 1, 2020, 5 pages.

* cited by examiner

WAN transmission and D2D transmission through resource based on mode other than mode I WAN transmission and D2D transmission through resource based on mode I

FIG. 15

| WAN transmission of UE in CC1 | Slot 1 = 22dBm | Slot 2 = 21dBm |

| D2D transmission of UE in CC2 | Slot 1 = 20dBm | Slot 2 = 21dBm |

WAN transmission of UE in CC1

| Slot 1<br>= A dBm | Slot 2<br>= B dBm |
|---|---|

D2D transmission of UE in CC2

| | Slot 1<br>= A' dBm | Slot 2<br>= B' dBm |
|---|---|---|

WAN transmission and D2D transmission through resource based on mode other than mode I WAN transmission and D2D transmission through resource based on mode other than mode I WAN transmission and D2D transmission through resource based on mode I WAN transmission and D2D transmission through resource based on mode I

METHOD AND USER EQUIPMENT FOR TRANSMITTING UPLINK SIGNAL AND PROSE SIGNAL

CROSS-REFERENCE TO RELATED APPLICATIONS

This application is a continuation of U.S. patent application Ser. No. 15/758,716, filed on Mar. 8, 2018, now U.S. Pat. No. 10,575,257, which is the National Stage filing under 35 U.S.C. 371 of International Application No. PCT/KR2016/010260, filed on Sep. 12, 2016, which claims the benefit of U.S. Provisional Application Nos. 62/220,246, filed on Sep. 18, 2015 and 62/236,986, filed on Oct. 5, 2015, the contents of which are all hereby incorporated by reference herein in their entirety.

BACKGROUND OF THE INVENTION

Field of the Invention

The present invention relates to mobile communication.

Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink.

Development of 3GPP LTE-Advanced (LTE-A) which is an evolution of the 3GPP LTE has been completed in recent years. According to the LTE-A, a carrier aggregation (CA) technology is presented, which aggregates and uses multiple bands into one.

A frequency which can be used for LTE/LTE-A, that is, a carrier, is defined in 3GPP by considering radio wave situations of various countries.

With increasing demands for social networking services (SNSs) from users, communication between user equipments (UEs) physically adjacent, that is, device-to-device (D2D) communication, is required.

However, when a D2D signal to an adjacent UE and a signal to a base station (BS) are simultaneously transmitted, a UE has transmission power determined depending on the power class of the UE, and thus it is necessary to divide the transmission power to transmit the signals. Therefore, it is needed to study a method for a UE to transmit all data signals without exceeding maximum transmission power according to the power class.

SUMMARY OF THE INVENTION

Accordingly, a disclosure of the present specification has been made in an effort to solve the aforementioned problem.

In order to achieve the above-described technical object of the present invention, a disclosure of this specification provides a method for simultaneously transmitting a cellular uplink signal and a proximity service (ProSe) signal. The method may be performed by a user equipment (UE) and comprise: determining a total transmission power $P_{CMAX}$ for the cellular uplink signal and the ProSe signal. The total transmission power $P_{CMAX}$ may satisfies $P_{CMAX\_L} \leq P_{CMAX} \leq P_{CMAX\_H}$. The $P_{CMAX\_L}$ is a lower bound and $P_{CMAX\_H}$ may be an upper bound. If the cellular uplink signal is transmitted on subframe n, if the ProSe signal is transmitted on subframe m and if the subframe n is asynchronous with the subframe m, the subframe n may be taken as a reference. If the transmission of the uplink signal leads the transmission of the ProSe signal, the upper bound $P_{CMAX\_H}$ may be determined in consideration of subframe pairs of (n, m) and (n, m−1).

The upper bound $P_{CMAX\_H}$ is determined by a following equation:

$$P_{CMAX\_H} = \text{MAX}\{P_{CMAX\_H}(n,m-1), P_{CMAX\_H}(n,m)\}.$$

The cellular uplink signal may be transmitted to a base station and the ProSe signal may be transmitted to an adjacent other UE.

A carrier for transmitting the cellular uplink signal may be different from a carrier for transmitting the ProSe signal.

A carrier for transmitting the cellular uplink signal and a carrier for transmitting the ProSe signal may correspond to an inter-band carrier aggregation.

In order to achieve the above-described technical object of the present invention, a disclosure of this specification also provides a user equipment (UE) for simultaneously transmitting a cellular uplink signal and a proximity service (ProSe) signal. The UE may comprise: a processor configured to determine a total transmission power $P_{CMAX}$ for the cellular uplink signal and the ProSe signal. The total transmission power $P_{CMAX}$ may satisfies $P_{CMAX\_L} \leq P_{CMAX} \leq P_{CMAX\_H}$. The $P_{CMAX\_L}$ is a lower bound and $P_{CMAX\_H}$ may be an upper bound. If the cellular uplink signal is transmitted on subframe n, if the ProSe signal is transmitted on subframe m and if the subframe n is asynchronous with the subframe m, the subframe n may be taken as a reference. If the transmission of the uplink signal leads the transmission of the ProSe signal, the upper bound $P_{CMAX\_H}$ may be determined in consideration of subframe pairs of (n, m) and (n, m−1).

Accordingly, a disclosure of the present specification has been made in an effort to solve the aforementioned problem.

BRIEF DESCRIPTION OF THE DRAWINGS

FIG. 15 illustrates WAN transmission power per slot for a UE in CC1 and D2D transmission power per slot for the UE in CC2.

FIG. 16 illustrates WAN transmission power per slot for a UE in CC1 and D2D transmission power per slot for the UE in CC2 in the situation of FIG. 14a.

DESCRIPTION OF EXEMPLARY EMBODIMENTS

Figure 1:
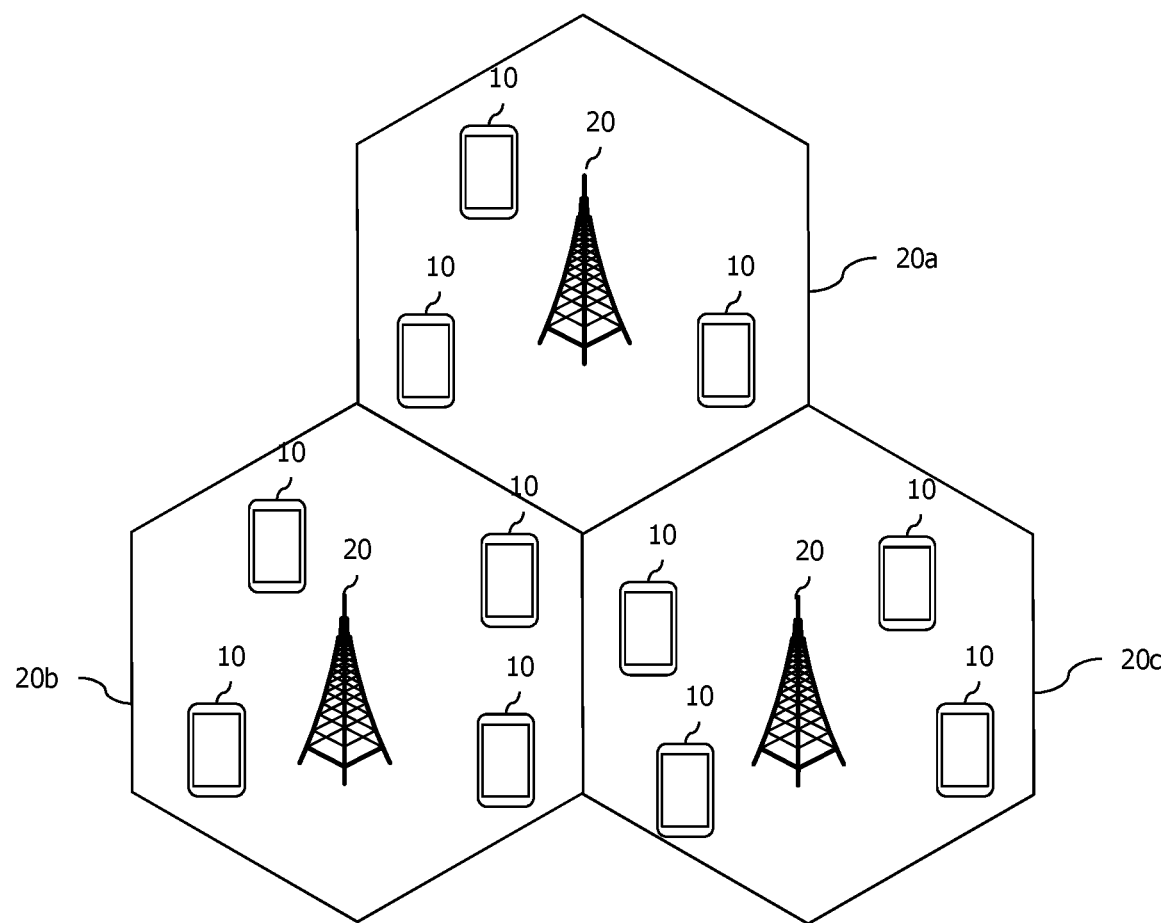
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS(mobile station), UT(user terminal), SS(subscriber station), MT(mobile terminal) and etc.

FIG. 1 illustrates a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Hereinafter, the LTE system will be described in detail.

Figure 2:
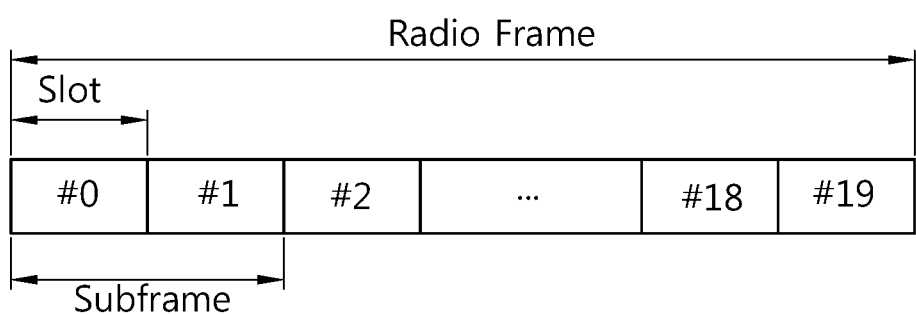
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
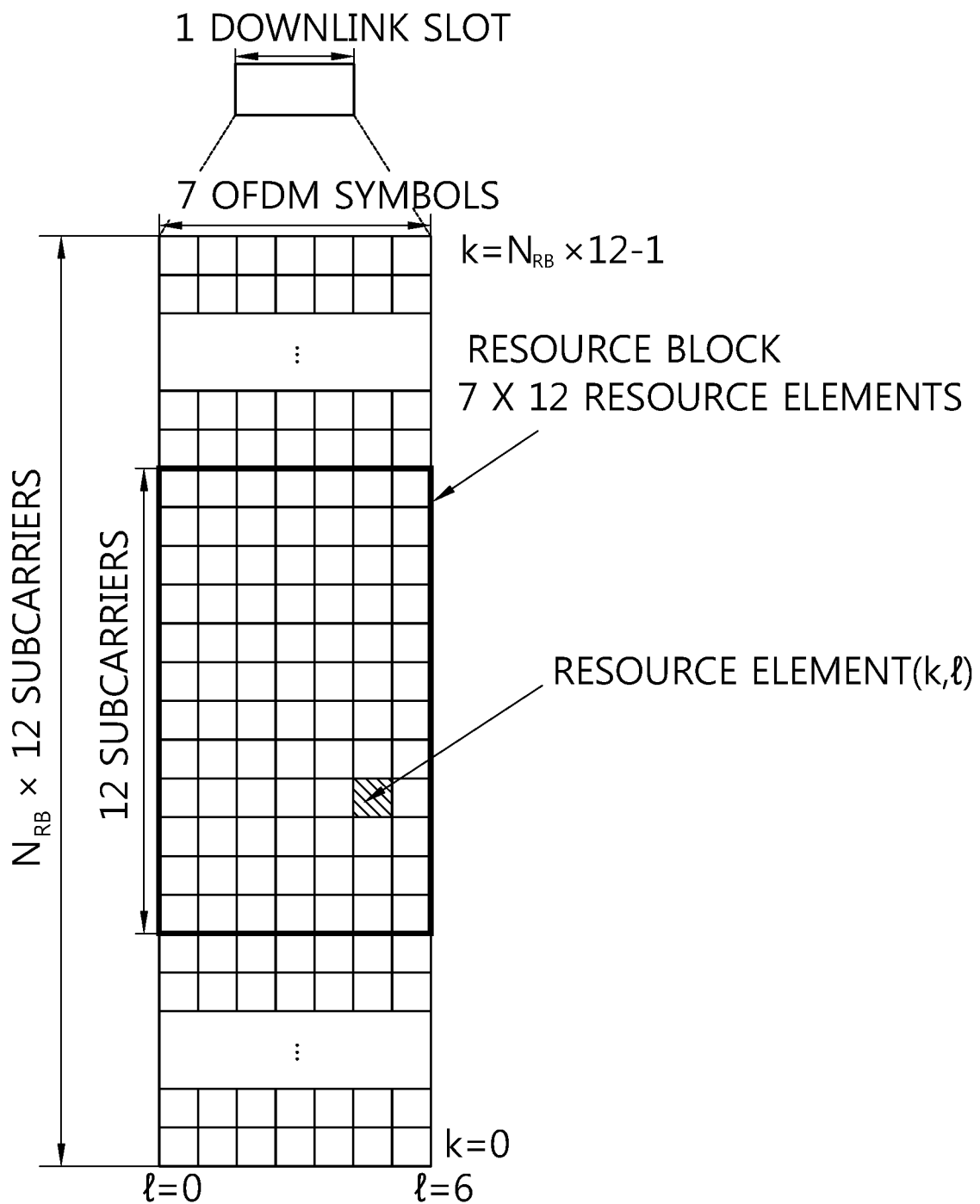
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and $N_{RB}$ resource blocks (RBs) in the frequency domain. For example, in the LTE system, the number of resource blocks (RBs), i.e., NRB, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

Figure 4:
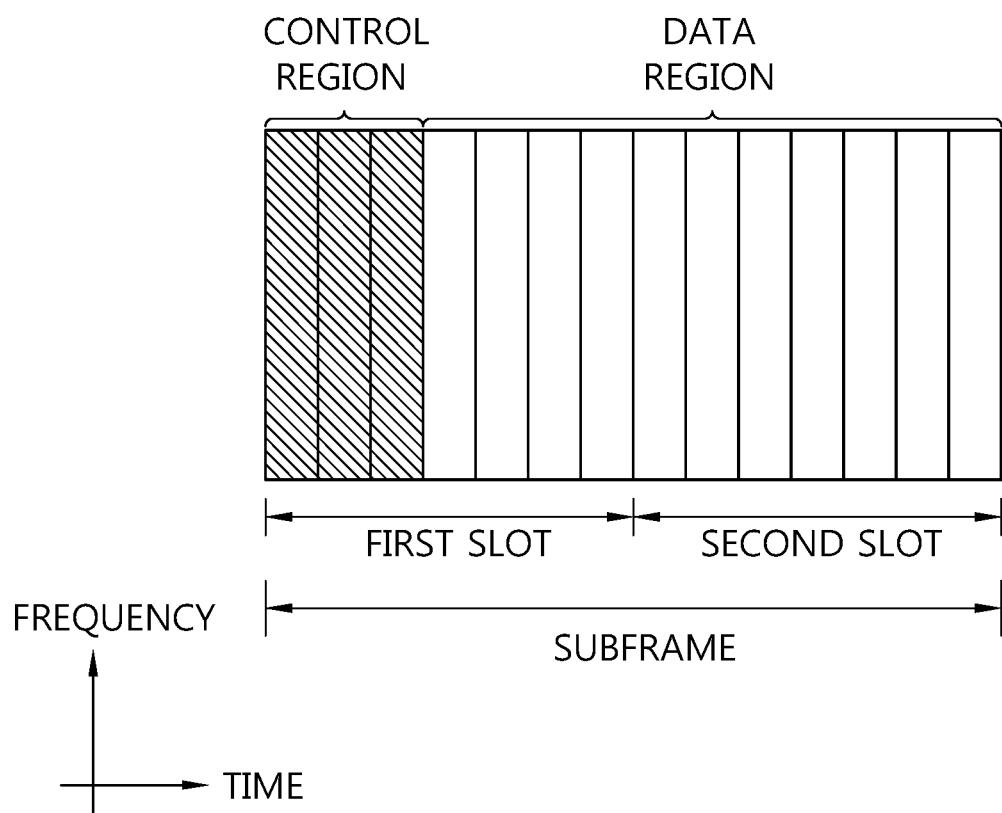
FIG. 4 illustrates the architecture of a downlink subframe.

In 3GPP LTE, the resource grid for one uplink slot shown in FIG. 4 may also apply to the resource grid for the downlink slot.

FIG. 4 illustrates the architecture of a downlink subframe.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 5:
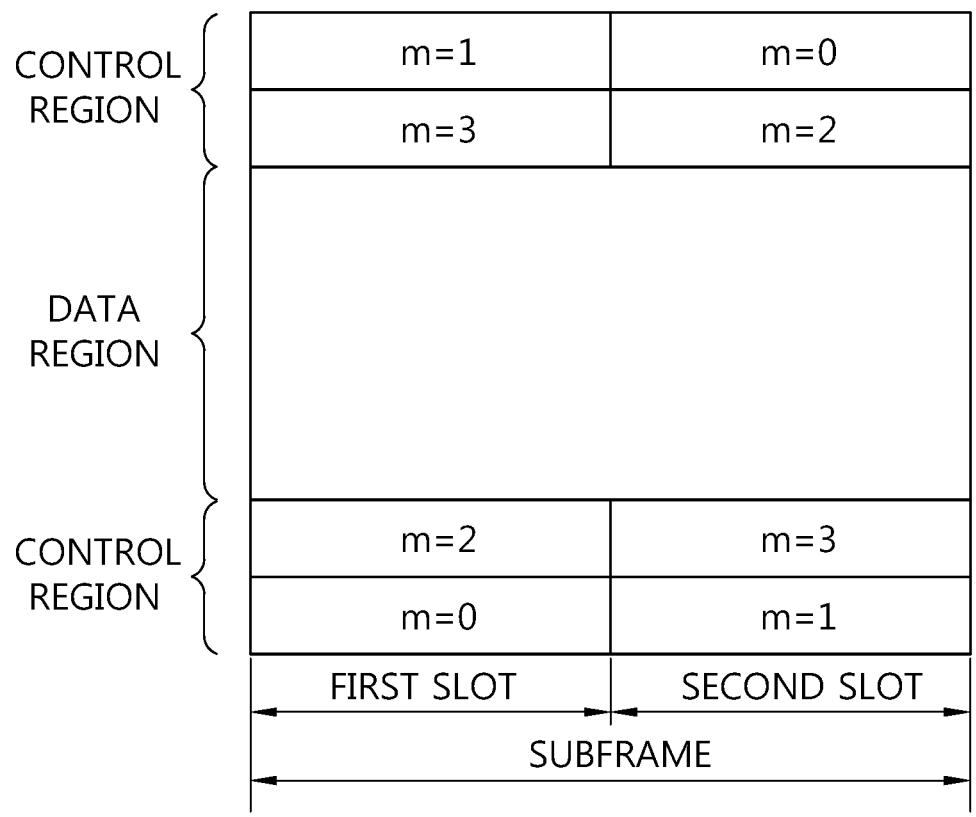
FIG. 5 illustrates the architecture of an uplink subframe in 3GPP LTE.
Figure 5:
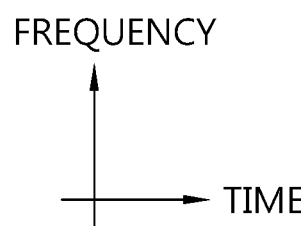

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator).Or, the uplink data may consist only of control information.

<Carrier Aggregation: CA>

Hereinafter, a carrier aggregation system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

The carrier aggregation system may be divided into a continuous carrier aggregation system in which aggregated carriers are contiguous and a non-contiguous carrier aggregation system in which the aggregated carriers are separated from each other. Hereinafter, when the contiguous and non-contiguous carrier systems are just called the carrier aggregation system, it should be construed that the carrier aggregation system includes both a case in which the component carriers are contiguous and a case in which the component carriers are non-contiguous. The number of component carriers aggregated between the downlink and the uplink may be differently set. A case in which the number of downlink CCs and the number of uplink CCs are the same as each other is referred to as symmetric aggregation and a case in which the number of downlink CCs and the number of uplink CCs are different from each other is referred to as asymmetric aggregation.

Meanwhile, the carrier aggregation (CA) technologies, as described above, may be generally separated into an inter-band CA technology and an intra-band CA technology. The inter-band CA is a method that aggregates and uses CCs that are present in different bands from each other, and the intra-band CA is a method that aggregates and uses CCs in the same frequency band. Further, CA technologies are more specifically split into intra-band contiguous CA, intra-band non-contiguous CA, and inter-band non-contiguous CA.

Figure 6A:
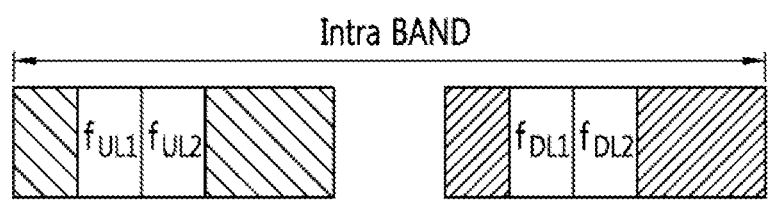
FIGS. 6A and 6B are conceptual views illustrating intra-band carrier aggregation (CA).
Figure 6B:
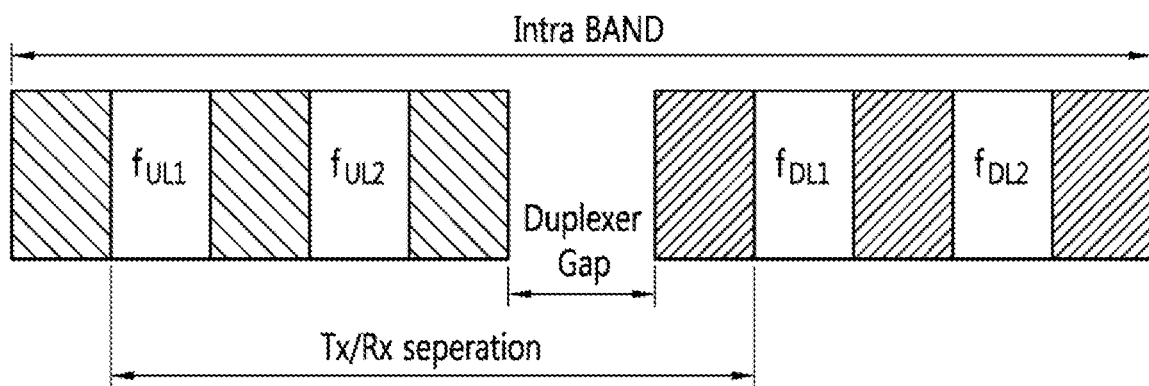

FIGS. 6a and 6b are concept views illustrating intra-band carrier aggregation (CA).

FIG. 6a illustrates intra-band contiguous CA, and FIG. 6b illustrates intra-band non-contiguous CA.

LTE-advanced adds various schemes including uplink MIMO and carrier aggregation in order to realize high-speed wireless transmission. The CA that is being discussed in LTE-advanced may be split into the intra-band contiguous CA shown in FIG. 6a and the intra-band non-contiguous CA shown in FIG. 6b.

Figure 7A:
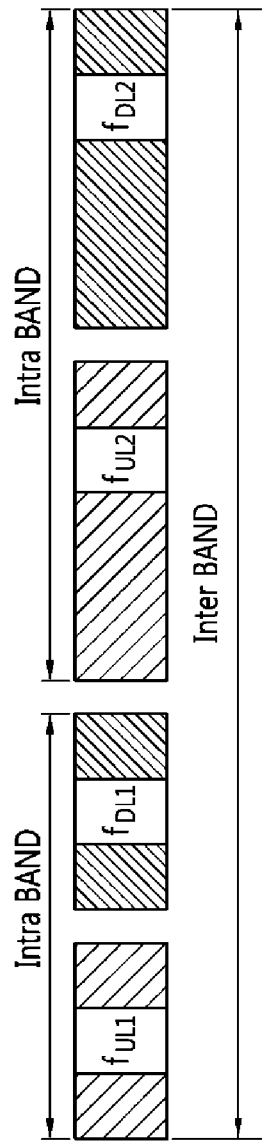
FIGS. 7A and 7B are conceptual views illustrating inter-band carrier aggregation (CA).
Figure 7B:
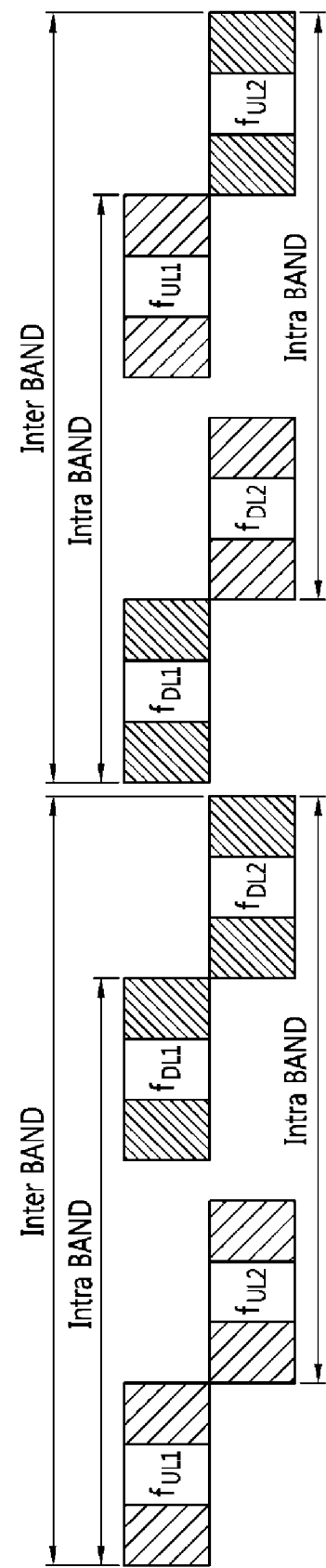

FIGS. 7a and 7b are concept views illustrating inter-band carrier aggregation.

FIG. 7a illustrates a combination of a lower band and a higher band for inter-band CA, and FIG. 7b illustrates a combination of similar frequency bands for inter-band CA.

In other words, the inter-band carrier aggregation may be separated into inter-band CA between carriers of a low band and a high band having different RF characteristics of inter-band CA as shown in FIG. 7a and inter-band CA of similar frequencies that may use a common RF terminal per component carrier due to similar RF (radio frequency) characteristics as shown in FIG. 7b.

TABLE 1

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 1 | 1920 MHz-1980 MHz | 1920-1 MHz | 1980 MHz |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |

TABLE 1-continued

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 61 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A N/A | 1452 MHz-1496 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

The 3GPP LTE/LTE-A system defines uplink and downlink operating bands as in Table 1. The four CA cases illustrated in FIGS. 6 and 7 are divided according to Table 1.

Here, $F_{UL\_low}$ denotes the lowest frequency in an uplink operating band. $F_{UL\_high}$ denotes the highest frequency in an uplink operating band. $F_{DL\_low}$ denotes the lowest frequency in a downlink operating band. $F_{DL\_high}$ denotes the highest frequency in a downlink operating band.

When operating bands are set as in Table 1, the frequency distribution organization of each country may allocate a particular frequency to a service provider according to the situation of each country.

As described above, the 3GPP LTE system supports channel bandwidths of 1.4 MHz, 3 MHz, 5 MHz, 10 MHz, 15 MHz, and 20 MHz. The relationship between a channel bandwidth and the number of resource blocks is as follows.

TABLE 2

| $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Wireless transmission causes unwanted emission to adjacent bands. Here, regarding interference by emission due to transmission by a BS, the level of interference introduced into adjacent bands may be reduced to be an allowable threshold or lower using the characteristics of the BS, such as by designing an expensive and large-sized RF filter. Regarding interference by a UE, however, it is difficult to completely prevent the introduction of interference into adjacent bands due to limits on UE size or the price of a power amplifier or a pre-duplex filter RF device.

Therefore, it is necessary to limit the transmission power of a UE.

Maximum power (Pcmax) actually available for a UE in the LTE system is simply represented as follows.

$$Pcmax=Min(Pemax, Pumax) \qquad [Equation 1]$$

Here, Pcmax denotes the maximum transmission power available for a UE (actual maximum transmission power) on a cell, and Pemax denotes the maximum allowed power on the cell that is signalled by a BS. Further, Pumax denotes the maximum power ($P_{PowerClass}$) for the UE adjusted according to the maximum power reduction (hereinafter, MPR), the additional MPR (hereinafter, A-MPR), or the like.

The maximum power ($P_{PowerClass}$) for the UE is illustrated as below.

TABLE 3

| Operating band | Power class 1 (dBm) | Power class 3 (dBm) |
|---|---|---|
| 1, 2, 3, 4, 5, 6, 7, 8, 9, 10, 11, 12, 13, 14, 17, 18, 18, 19, 20, 21, 22, 23, 24, 25, 26, 27, 28, 30, 31, 33, 34, 35, 36, 37, 38, 39, 40, 41, 42, 43, 44 | | 23 dBm |
| 14 | 31 dBm | |

In intra-band contiguous CA, the maximum power ($P_{PowerClass}$) for the UE is illustrated as below.

TABLE 4

| Operating band | Power class 3 (dBm) |
|---|---|
| CA_1C | 23 dBm |
| CA_3C | 23 dBm |
| CA_7C | 23 dBm |
| CA_38C | 23 dBm |
| CA_39C | 23 dBm |
| CA_40C | 23 dBm |
| CA_41C | 23 dBm |
| CA_42C | 23 dBm |

Figure 8:
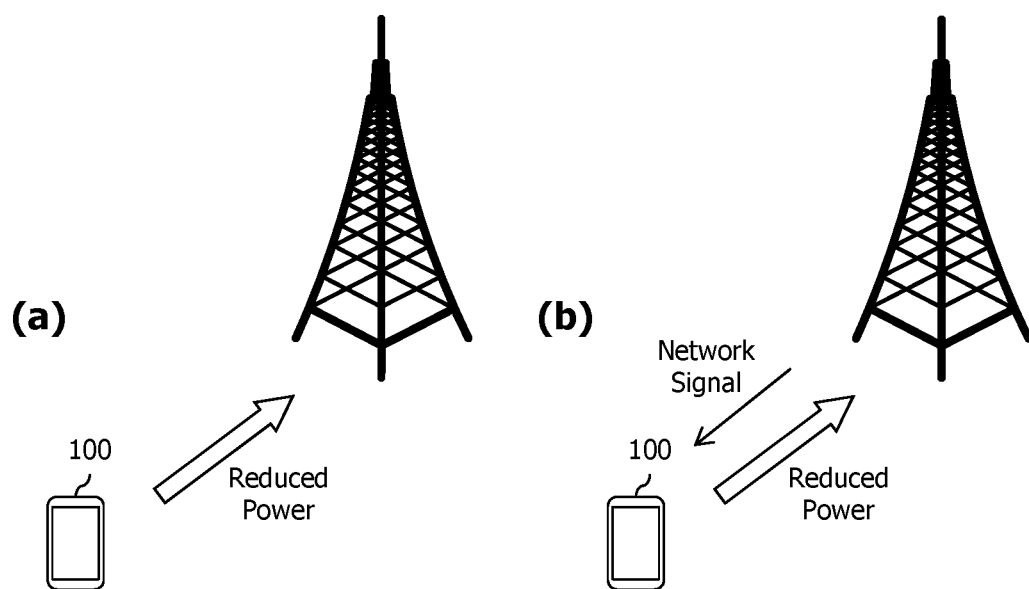
FIG. 8 illustrates a method for limiting the transmission power of a UE.

FIG. 8 illustrates a method for limiting the transmission power of a UE.

As illustrated in (a) of FIG. 8, a UE performs transmission with limited transmission power.

When a peak-to-average power ratio (PAPR) is high, the linearity of a power amplifier (PA) decreases accordingly. Thus, to maintain the linearity, an MPR value of up to 2 dB for limiting transmission power may be applied depending on the modulation scheme.

(A) MPR in 3GPP Release 11

According to 3GPP Release 11, a UE may adopt multi-clustered transmission for a single component carrier (CC) and thus may simultaneously transmit a PUSCH and a PUCCH. When the PUSCH and the PUCCH are simultaneously transmitted, the size of IM3 components (distorted signals generated by intermodulation) occurring in an out-of-band region may increase, and accordingly the IM3 components may act as greater interference in an adjacent band. Therefore, an MPR value may be set to satisfy UE's emission requirements the UE needs to follow for uplink transmission, such as general spurious emission (SE), an adjacent channel leakage ratio, and a general spectrum emission mask (SEM).

(B) A-MPR

As illustrated in (b) of FIG. 8, a BS may transmit a network signal (NS) to a UE 100, thereby applying A-MPR. Unlike in MPR mentioned above, in A-MPR, in order not to cause an impact on, for example, interference in, an adjacent band, a BS transmits a network signal (NS) to a UE 100 operating in a particular operating band so that the UE 100 additionally reduces power. That is, when an MPR-applied UE receives a network signal (NS), the UE additionally applies an A-MPR to determine transmission power.

The following table illustrates an A-MPR value according to the network signal.

TABLE 5

| Network signaling value | E-UTRA band | Channel bandwidth (MHz) | Number of resource blocks ($N_{RB}$) | A-MPR (dB) |
|---|---|---|---|---|
| NS_01 | Entire LTE operating band | 1.4, 3, 5, 10, 15, 20 | | N/A |
| NS_03 | 2, 4, 10, 23, 25, 35, 36, 66 | 3 | >5 | ≤1 |
| | | 5 | >6 | ≤1 |
| | | 10 | >6 | ≤1 |
| | | 15 | >8 | ≤1 |
| | | 20 | >10 | ≤1 |
| NS_04 | 41 | 5, 10, 15, 20 | See Table 6 | |
| NS_05 | 1 | 10, 15, 20 | ≥50 | ≤1 |
| | | 15, 20 | See Table 7 | |
| | 65 | 10, 15, 20 | ≥50 | ≤1 |
| | | 15, 20 | See Table 7 | |
| NS_06 | 12, 13, 14, 17 | 1.4, 3, 5, 10 | N/A | |
| NS_07 | 13 | 10 | See Table 8 | |
| NS_08 | 19 | 10, 15 | >44 | ≤3 |
| NS_09 | 21 | 10, 15 | >40 | ≤1 |
| | | | >55 | ≤2 |
| ... | | | | |
| NS_18 | | 5 | ≥2 | ≤1 |
| | | 10, 15, 20 | ≥1 | ≤4 |
| ... | | | | |
| NS_24 | 65 | 5, 10, 15, 20 | See Table 9 | |
| NS_25 | 65 | 5, 10, 15, 20 | See Table 10 | |
| NS_26 | 68 | 5, 10, 15 | See Table 11 | |

The following table illustrates an A-MPR requirement according to "NS_04" signaling with bandwidth >5 MHz.

TABLE 6

| Channel bandwidth [MHz] | Parameter | | | | | |
|---|---|---|---|---|---|---|
| 5 | Fc [MHz] | | ≤2499.5 | | | >2499.5 |
| | $RB_{start}$ | | 0-8 | | 9-24 | 0-24 |
| | $L_{CRB}$ [RBs] | | >0 | | >0 | >0 |
| | A-MPR [dB] | | ≤2 | | 0 | 0 |
| 10 | Fc [MHz] | | ≤2504 | | | >2504 |
| | $RB_{start}$ | | 0-8 | | 9-35 | 36-49 | 0-49 |
| | $L_{CRB}$ [RBs] | ≤15 | >15 and <25 | ≥25 | N/A | >0 | >0 |
| | $RB_{start}^+$ $L_{CRB}$ [RBs] | N/A | N/A | N/A | ≥45 | N/A | N/A |
| | A-MPR [dB] | ≤3 | ≤1 | ≤2 | ≤1 | 0 | 0 |
| 15 | Fc [MHz] | | ≤2510.8 | | | >2510.8 |
| | $RB_{start}$ | | 0-13 | | 14-59 | 60-74 | 0-74 |
| | $L_{CRB}$ [RBs] | ≤18 or ≥36 | >18 and <36 | N/A | >0 | >0 |
| | $RB_{start}^+$ | N/A | N/A | ≥62 | N/A | N/A |

TABLE 6-continued

| Channel bandwidth [MHz] | Parameter | | | | | |
|---|---|---|---|---|---|---|
| 20 | $L_{CRB}$ [RBs] | ≤3 | ≤1 | ≤1 | 0 | 0 |
| | A-MPR [dB] | | | | | |
| | Fc [MHz] | | ≤2517.5 | | | >2517.5 |
| | $RB_{start}$ | 0-22 | | 23-76 | 77-99 | 0-99 |
| | $L_{CRB}$ [RBs] | ≤18 or ≥40 | >18 and <40 | N/A | >0 | >0 |
| | $RB_{start}^{+}$ | N/A | N/A | ≥86 | N/A | N/A |
| | $L_{CRB}$ [RBs] | | | | | |
| | A-MPR [dB] | ≤3 | ≤1 | ≤1 | 0 | 0 |

The following table illustrates an A-MPR according to "NS_05" signaling.

TABLE 7

| Channel bandwidth [MHz] | Parameter | | | | | | |
|---|---|---|---|---|---|---|---|
| 15 | Fc [MHz] | | | 1932.5 | | | |
| | $RB_{start}$ | 0-7 | | 8-66 | | 67-74 | |
| | $L_{CRB}$ [RBs] | ≥1 | ≤30 | 31-54 | >54 | ≤6 | >6 |
| | A-MPR [dB] | ≤11 | 0 | ≤3 | ≤5 | ≤5 | ≤1 |
| 20 | Fc [MHz] | | | 1930 | | | |
| | $RB_{start}$ | 0-23 | | 24-75 | | 76-99 | |
| | $L_{CRB}$ [RBs] | ≥1 | ≤24 | 25-40 | 41-50 | >50 | ≤6 | >6 |
| | A-MPR [dB] | ≤11 | 0 | ≤3 | ≤5 | ≤10 | ≤5 | ≤1 |

The following table illustrates an A-MPR according to "NS_07" signaling.

TABLE 8

| Parameter | | Region A | | Region B | Region C |
|---|---|---|---|---|---|
| $RB_{start}$ | | 0-12 | | 13-18 | 19-42 | 43-49 |
| $L_{CRB}$ [RBs] | 6-8 | 1 to 5 and 9-50 | | ≥8 | ≥18 | ≤2 |
| A-MPR [dB] | ≤8 | ≤12 | | ≤12 | ≤6 | ≤3 |

The following table illustrates an A-MPR according to "NS_24" signaling.

TABLE 9

| Channel bandwidth [MHz] | Parameter | | | | | | |
|---|---|---|---|---|---|---|---|
| 5 | Fc [MHz] | | | Fc > [1987.5] | | | |
| | $RB_{start}$ | | | 0-24 | | | |
| | $L_{CRB}$ [RBs] | | | 0-24 | | | |
| | A-MPR [dB] | | | ≤10 | | | |
| 10 | Fc [MHz] | | 1975 < Fc ≤ 1985 | | | 1985 < Fc ≤ 1995 | Fc > 1995 |
| | $RB_{start}$ | 0-1 | 2-14 | 15-26 | 36-49 | 0-49 | 0-49 |
| | $L_{CRB}$ [RBs] | >10 | ≥35 | N/A | ≤2 | >11 | 0-49 | 0-49 |
| | $RB_{end}$ | N/A | N/A | >48 | N/A | N/A | N/A | N/A |
| | A-MPR [dB] | ≤2 | ≤2 | 1 | ≤3 | ≤1 | ≤9 | ≤17 |
| 15 | Fc [MHz] | | 1972.5 < Fc ≤ 1987.5 | | | | Fc > 1987.5 |
| | $RB_{start}$ | | 0-11 | | | 12-74 | 0-74 |
| | $L_{CRB}$ [RBs] | ≤45 | | >45 | | >3 | 0-74 |
| | $RB_{end}$ | N/A | | N/A | | ≥45 | N/A |
| | A-MPR [dB] | ≤2 | | ≤8 | | ≤7 | ≤17 |
| 20 | Fc [MHz] | | | Fc > 1970 | | | |
| | $RB_{start}$ | | | 0-99 | | | |
| | $L_{CRB}$ [RBs] | | | 0-99 | | | |
| | A-MPR [dB] | | | ≤17 | | | |

The following table illustrates an A-MPR according to "NS_25" signaling.

TABLE 10

| Channel bandwidth [MHz] | Parameter | | |
|---|---|---|---|
| 5 | Fc [MHz] | | Fc > [1997.5] |
| | $RB_{start}$ | 0-9 | 10-24 |
| | $L_{CRB}$ [RBs] | >12 | N/A |
| | $RB_{end}$ | N/A | ≥22 |
| | A-MPR [dB] | ≤5 | ≤2 |

TABLE 10-continued

| Channel bandwidth [MHz] | Parameter | | | | | | | | |
|---|---|---|---|---|---|---|---|---|---|
| 10 | Fc [MHz] | 1975 < Fc ≤ 1985 | | 1985 < Fc ≤ 1995 | | | Fc > 1995 | | |
|  | $RB_{start}$ | 0-1 | 2-49 | 0 | 1 - 18 | 19-49 | 0-6 | 7-15 | 16-49 |
|  | $L_{CRB}$ [RBs] | >10 | N/A | ≤25 | >25 | >25 | N/A | N/A | >20 | N/A |
|  | $RB_{end}$ | N/A | >48 | N/A | N/A | N/A | >42 | N/A | N/A | >35 |
|  | A-MPR [dB] | ≤1 | ≤1 | ≤1 | ≤5 | ≤5 | ≤1 | ≤10 | ≤7 | ≤11 |
| 15 | Fc [MHz] | | | 1972.5 < Fc ≤ 1987.5 | | | | Fc > 1987.5 | |
|  | $RB_{start}$ | 0-4 | | 5-30 | | 31-62 | 63-74 | | 0-74 |
|  | $L_{CRB}$ [RBs] | ≥15 | | ≥45 | | N/A | N/A | | 0-74 |
|  | $RB_{end}$ | N/A | | N/A | | >71 | N/A | | N/A |
|  | A-MPR [dB] | ≤4 | | ≤3 | | ≤1 | ≤1 | | ≤13 |
| 20 | Fc [MHz] | | 1970 ≤ Fc ≤ 1990 | | | | Fc > 1990 | | |
|  | $RB_{start}$ | 0-13 | | 14-40 | | 41-99 | | 0-99 | |
|  | $L_{CRB}$ [RBs] | N/A | | ≥32 | | N/A | | 0-99 | |
|  | $RB_{end}$ | N/A | | N/A | | >72 | | N/A | |
|  | A-MPR [dB] | ≤11 | | ≤11 | | ≤13 | | ≤13 | |

The following table illustrates an A-MPR according to "NS_26" signaling.

TABLE 11

| Bandwidth (MHz) | RBstart | L_crb | A-MPR |
|---|---|---|---|
| 5 | 0 | ≤1 | ≤[0~1] |
|  | 0-1 | ≥24 | ≤[0~1] |
| 10 | 0-10 | ≥1 | ≤1 |
| 15 | 0-17 | ≥1 | ≤1 |

The transmission power of a UE may be represented by the following equation for obtaining $P_{cmax}$.

$P_{cmax}$ needs to satisfy the following condition.

$P_{CMAX\_L} \leq P_{CMAX} \leq P_{CMAX\_H}$   [Equation 2]

$P_{CMAX\_L}$ is a lower bound, which is obtained as follows.

$P_{CMAX\_L} = \text{MIN}\{P_{EMAX} - \Delta T_C, P_{PowerClass} - \text{MAX}(MPR + A - MPR, P - MPR) - \Delta T_C\}$   [Equation 3]

$P_{CMAX\_H}$ is an upper bound, which is obtained as follows.

$P_{CMAX\_H} = \text{MIN}\{P_{EMAX}, P_{PowerClass}\}$   [Equation 4]

$P_{EMAX}$ is given P-Max through an RRC signal. $P_{PowerClass}$ denotes the maximum UE power considering an allowable value. P-MPR denotes an allowable maximum transmission power reduction. P-MPR may be obtained using an equation for obtaining $P_{CMAX}$. $\Delta T_C$ may be 0 dB or 1.5 dB.

(C) A-MPR in CA

Considering CA, an uplink channel bandwidth may be increased to up to 40 MHz (20 MHz+20 MHz), and thus a greater MPR value is needed. Thus, when a BS transmits a network signal to a UE in order to protect a particular band in the CA environment, additional power reduction may be performed for a UE operating in the particular band, thereby protecting adjacent bands.

<Introduction of Small Cell>

In a next-generation mobile communication system, it is expected that a small cell with a small cell coverage radius is added in the coverage of a legacy cell and that the small cell handles a greater amount of traffic. The legacy cell has greater coverage than that of the small cell and thus is also referred to as a macrocell. Hereinafter, it is described with reference to FIG. 9.

Figure 9:
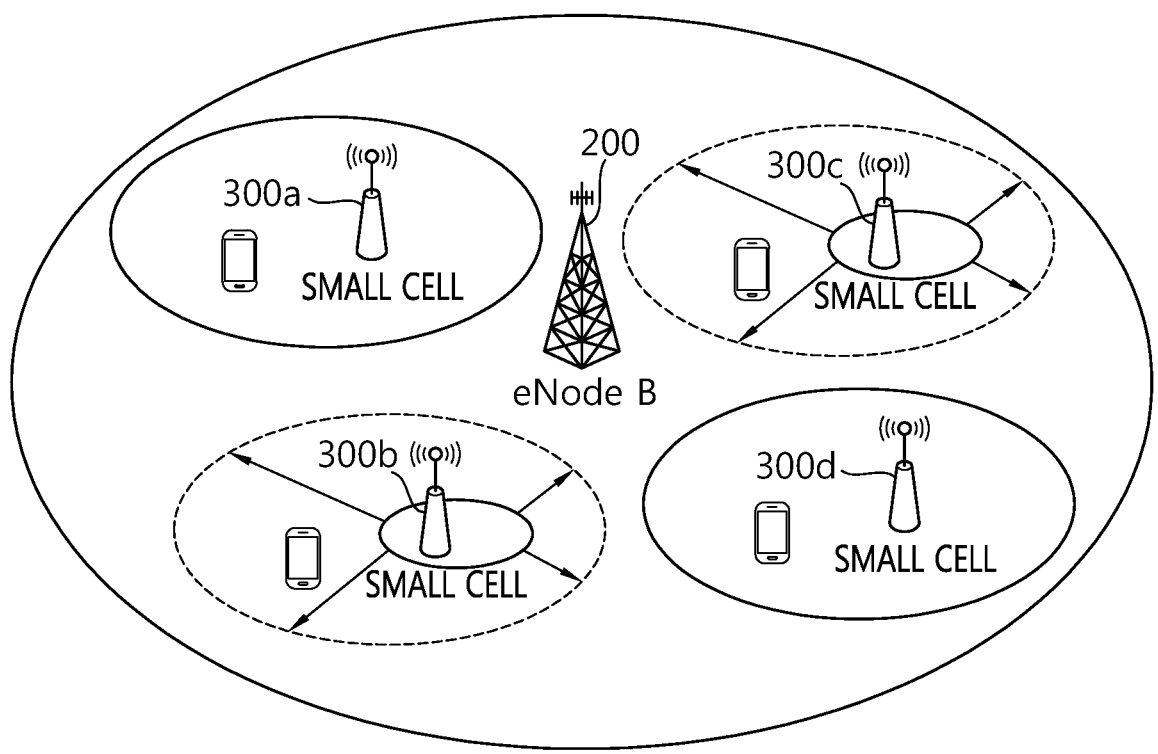
FIG. 9 shows a heterogeneous network environment, in which a macrocell and a small cell coexist, as a potential next-generation wireless communication system.

FIG. 9 shows a heterogeneous network environment, in which a macrocell and a small cell coexist, as a potential next-generation wireless communication system.

FIG. 9 shows a heterogeneous network environment in which a macrocell by a legacy BS 200 overlaps with one or more small cells by small BSs 300a, 300b, 300c, and 300d. The legacy BS provides greater coverage than those of the small BSs and thus is also referred to as a macro BS (macro eNodeB or MeNB). In the present specification, the terms "macrocell" and "macro BS" may be used together. A UE connected to the macrocell 200 may be referred to as a macro UE. The macro UE receives a downlink signal from the macro BS and transmits an uplink signal to the macro BS.

In such a heterogeneous network, coverage holes of the macrocell can be filled by configuring the macrocell as a primary cell (Pcell) and by configuring the small cells as a secondary cell (Scell). In addition, overall performance can be boosted by configuring the small cells as a Pcell and by configuring the macrocell as a Scell.

<Device-to-Device (D2D) Communication>

Hereinafter, D2D communication that is expected to be introduced in a next-generation communication system is described.

Figure 10A:
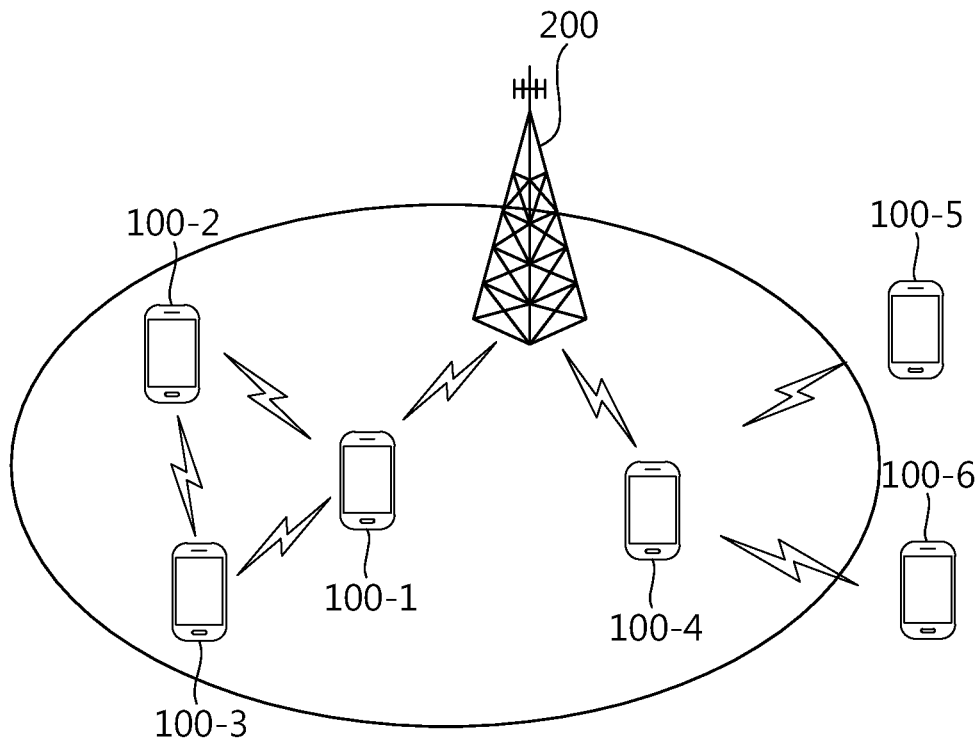
FIG. 10a illustrates the concept of D2D communication that is expected to be introduced in a next-generation communication system.

FIG. 10a illustrates the concept of D2D communication that is expected to be introduced in a next-generation communication system.

With increasing demands for social networking services (SNSs) from users, communication between user equipments (UEs) physically adjacent, that is, D2D communication, is required.

To reflect the foregoing requirements, discussions have been conducted on methods for enabling direct communication between UE#1 100-1, UE#2 100-2 and UE#3 100-3 or between UE#4 100-4, UE#5 100-5 and UE#6 100-6 without BS (eNodeB) intervention, illustrated in FIG. 10a. Direct communications between UE#1 100-1 and UE#4 100-4 is also possible with the aid of the BS (eNode) 200. UE#1 100-1 may also serve as a relay for UE#2 100-2 and UE#3 100-3. Likewise, UE#4 100-4 may serve as a relay for UE#5 100-5 and UE#6 100-6, which are distant from the center of the cell.

A link between UEs used for D2D communication is also referred to as a sidelink. Further, D2D is also referred to as proximity service (ProSe) communication.

Physical channels used for a sidelink are listed as follows.
Physical Sidelink Shared Channel (PSSCH)
Physical Sidelink Control Channel (PSCCH)
Physical Sidelink Discovery Channel (PSDCH)
Physical Sidelink Broadcast Channel (PSBCH)

As described above, it is expected that D2D communication between UEs is introduced in an upcoming system.

Figure 10B:
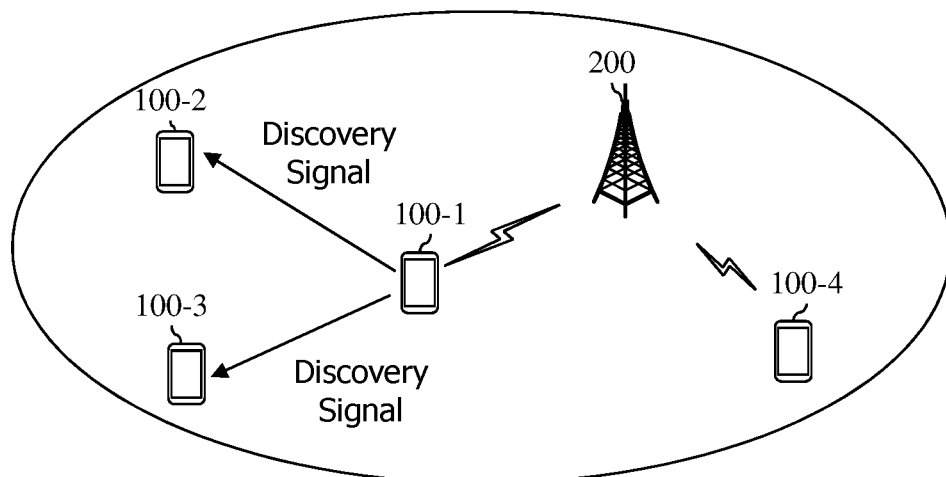
FIG. 10b illustrates an example of transmitting a discovery signal for D2D communication.

FIG. 10b illustrates an example of transmitting a discovery signal for D2D communication.

UE#1 100-1 illustrated in FIG 10b may transmit a discovery signalorder to detect whether there is a suitable neighboring UE for D2D communication or to report the presence of UE#1 100-1.

Resources for sidelink communication may be allocated according to the following two modes.

In a first mode (or mode I), resources for sidelink communication are allocated by a serving cell. To this end, a UE needs to be in an RRC-connected state. The UE requests resource allocation from e serving cell, and the serving cell allocates resources for the transmission of sidelink control information and data.

In a second mode (or mode II), a UE autonomously selects a resource. The UE autonomously selects resources for sidelink communication from resource pool.

<Disclosure of the Present Specification>

As described above, when one UE simultaneously performs cellular transmission (wide area network (WAN) transmission) and D2D transmission, in configuring transmission power for the UE, a higher priority is basically set for protecting legacy cellular data. In this case, power for cellular transmission needs to be maintained, and D2D transmission power needs to be adjusted so that the total transmission power does not exceed the maximum power for the UE. Therefore, the present specification proposes a method for adjusting only D2D transmission power so that total transmission power does not exceed maximum transmission power when cellular transmission and D2D transmission overlap over a certain interval.

Figure 11A:
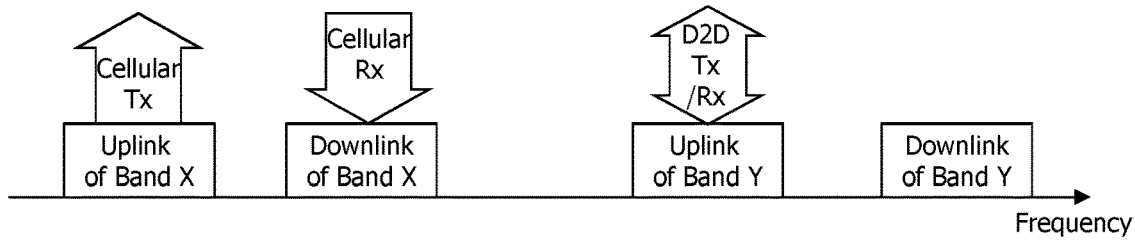
FIG. 11a illustrates an example in which a band used for D2D communication is different from an LTE/LTE-A band used for cellular communication.
Figure 11B:
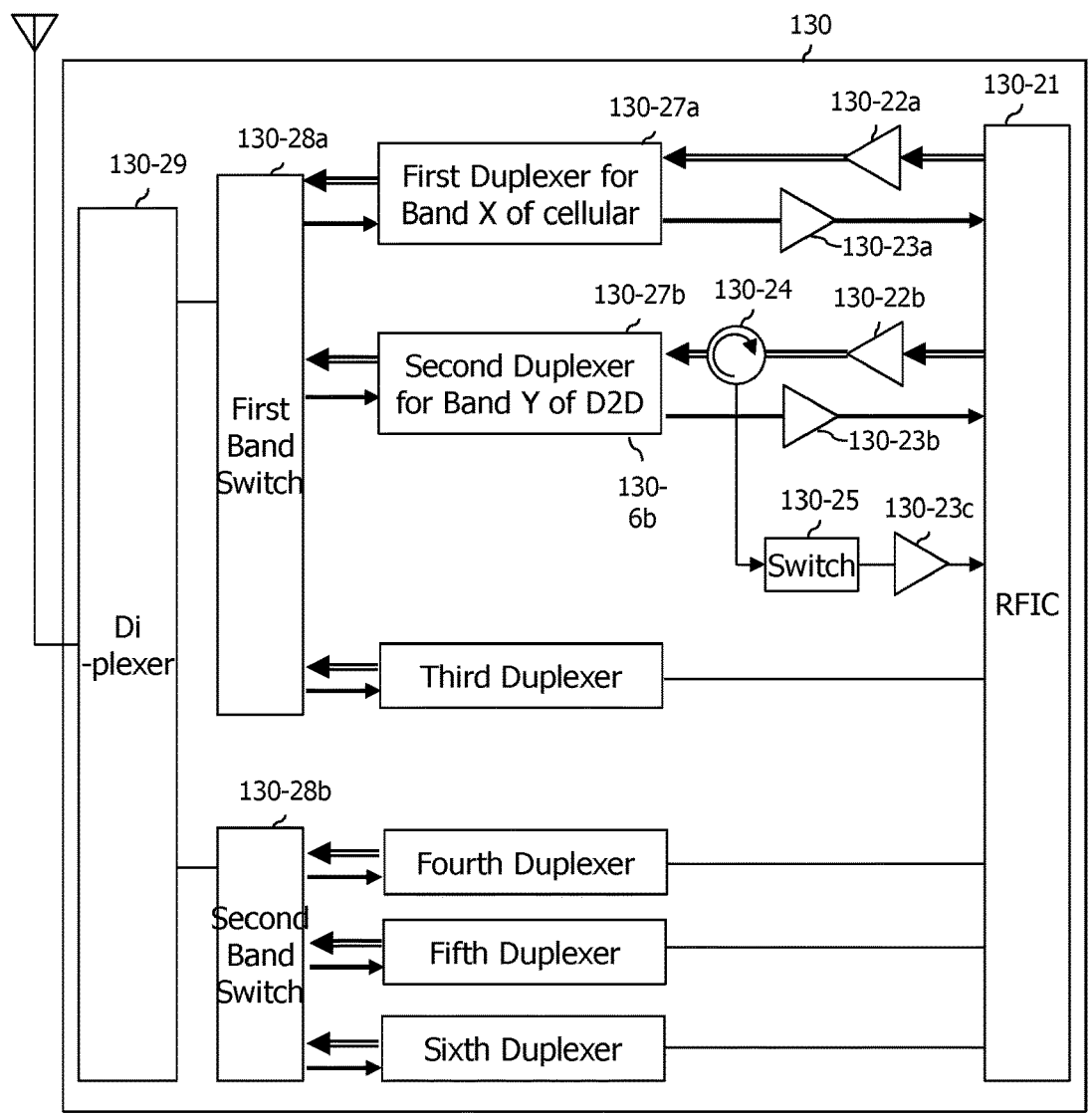
FIG. 11b illustrates an RF structure.

FIG. 11a illustrates an example in which a band used for D2D communication is different from an LTEILTE-A band used for cellular communication, and FIG. 11b illustrates an RF structure.

When an operating band for D2D communication and an operating band for cellular communication are different as illustrated in FIG. 11a, the structure illustrated in FIG. 11b is proposed, which uses a radio frequency integrated circuit (RFIC, including an amplifier, a synthesis unit, a filter, and a baseband unit) that accommodates an RF chain allocated for each band, similar to an LTE-A Release 10 structure.

FIG. 11b shows the RFIC 130-21 that accommodates a plurality of RF chains, a plurality of duplexers, a first band (e.g., high band) switch 130-28a to divide a plurality of high bands, a second band (e.g., low band) switch 130-28b to divide a plurality of low bands, and a diplexer 130-29.

A first duplexer 130-27a among the plurality of duplexers separates a transmission signal from a reception signal in a band X for cellular communication. A first PA 130-22a and a first LNA 130-23a are connected to the first duplexer 130-27a and the RFIC 130-21.

When only the band X is used for cellular communication and a band Y is deactivated. When the band Y is used for D2D communication, a second duplexer 130-27b among the plurality of duplexers separates a D2D transmission signal from a D2D reception signal in the band Y for D2D communication. A second PA 130-22b, a second LNA 130-23b, a directional coupler 130-24, a switch 130-25, and a third LNA 130-23c are connected to the second duplexer 130-27b and the MC 130-21.

A third duplexer among the plurality duplexers separates a transmission signal from a reception signal in a band Z.

The diplexer 130-29 synthesizes/separates low-band and high-band transmission/reception signals and is connected to the first band (e.g., high band) switch 130-28a and the second band (e.g., low band) switch 130-28b.

The first band switch 130-28a selectively exchanges a signal with any one of the first duplexer 130-27a for the band X for cellular communication, the second duplexer 130-27b for the band Y for D2D communication, and the third duplexer for the band Z. Likewise, the second band switch 130-28b selectively exchanges a signal with any one of a fourth duplexer, a fifth duplexer, and a sixth duplexer.

The first duplexer 130-27a separates a transmission signal and a reception signal of cellular communication and transmits the separated signals between the first band switch 130-28a and the RFIC 130-21. The first PA 130-22a is connected to a transmission line between the band duplexer 130-27a and the RFIC 130-21, and the first LNA 130-23a is connected to a reception line therebetween.

The second duplexer 130-27b separates a transmission signal and a reception signal of D2D communication and transmits the separated signals between the first band switch 130-28a and the RFIC 130-21, The first PA 130-22a and the directional coupler 130-24 are connected to a transmission line between the second duplexer 130-27b and the RFIC 130-21, and the second LNA 130-23b is connected to a reception line therebetween. The switch 130-25 and the third LNA 130-23c are connected to the directional coupler 130-24.

The operation of the RF structure illustrated in FIG. 11b is divided into transmission and reception as described below.

First, a reception operation will be described as follows.

When a signal is received through an antenna, the diplexer 130-29 transmits the signal to either the first band switch 130-28a or the second band switch 130-28b. When the first band switch 130-28a receives the received signal from the diplexer 130-29, the first band switch 130-28a transmits the signal to one or more of the first duplexer 130-27a and the second duplexer 130-27b. When the received signal is a received signal of cellular communication, the first duplexer 130-27a transmits the received signal of cellular communication to the RFIC 130-21 via the first LNA 130-23a. When the received signal is a received signal of D2D communication in the band Y, the second duplexer 130-27b transmits the received signal of D2D communication to the directional coupler 130-24, the directional coupler 130-24 transmits the received signal of D2D communication to the third LNA 130-23c, and then the received signal of D2D communication is transmitted to the RFIC 130-21 via the third LNA 130-23c. When a cellular signal in the band Y is received, the signal passes through the second duplexer 130-27b and is then transmitted to the RFIC 130-21 via the second LNA 130-23b.

Next, a transmission operation will be described as follows.

A transmission signal of cellular communication in the band X output from the RFIC 130-21 is amplified through the first PA 130-22a and is transmitted to the first duplexer 130-27a. The first duplexer 130-27a transmits the amplified transmission signal of cellular communication to the first band switch 130-28a. A transmission signal of D2D communication in the band Y output from the RFIC 130-21 is amplified through the second PA 130-22b and is transmitted to the directional coupler 130-24, and the directional coupler 130-24 transmits the amplified transmission signal of D2D communication to the second duplexer 130-27b. The second duplexer 130-27b transmits the amplified transmission signal of D2D communication to the first band switch 130-28a. The first band switch 130-28a selectively transmits the amplified transmission signal of cellular communication and the amplified transmission signal of D2D communication or transmits all of the two transmission signals to the diplexer 130-29 through a diplexer added between the first band switch and the duplexer.

Based on the above RF structure, the present specification proposes a method in which a UE performing D2D communication (hereinafter, referred to as a D2D UE or a ProSe UE) efficiently determines transmission power for a D2D signal.

Carriers for D2D communication and carders for cellular communication may be aggregated as the following combinations.

USA: B2 (D2D)+B4 (WAN)
Region 1 and Region 3: B28 (D2D)+B1 (WAN)

Figure 12A:
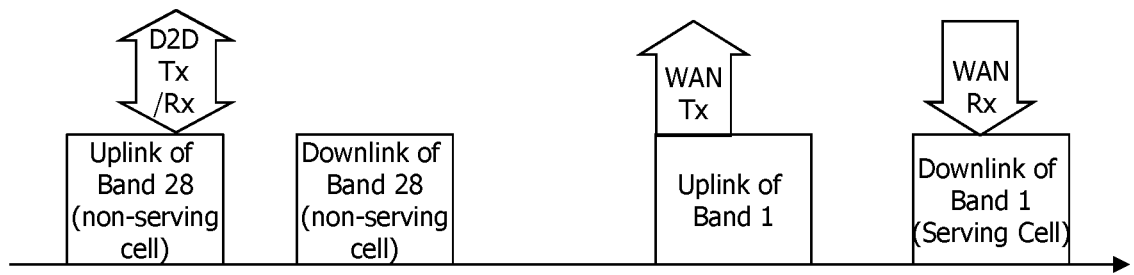
FIGS. 12a to 12c illustrate bands for D2D transmission/ reception and for WAN transmission/reception.
Figure 12B:
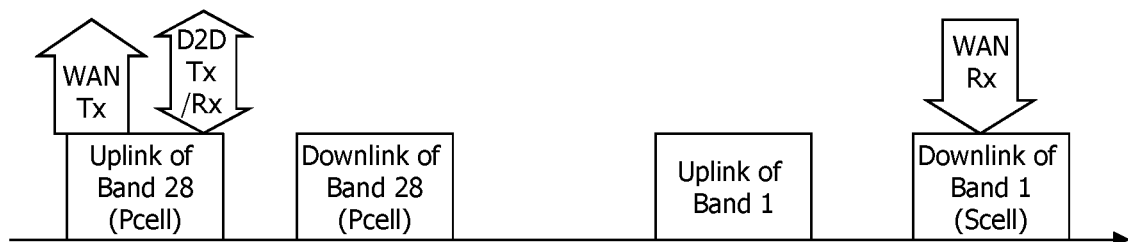
Figure 12C:
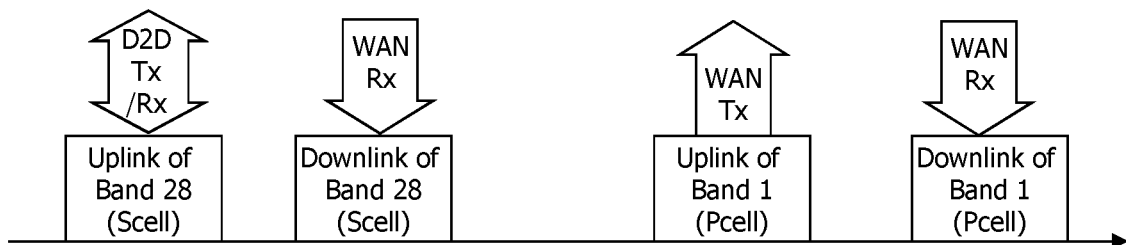

FIGS. 12a to 12c illustrate bands for D2D transmission/reception and for WAN transmission/reception.

As illustrated in FIG. 12a, band 1 is a band in which a UE receives a signal from a serving cell of a BS, while band 28 is an unassigned band in which no WAN service is performed, which is not for receiving data from the serving cell of the cellular BS. Here, D2D transmission/reception may be performed on an uplink of band 28 where the serving cell does not operate.

As illustrated in FIG. 12b, band 28 may be a band in which a Pcell of a cellular BS operates, and band 1 may be a band in which a Scell of the cellular BS operates. Here, D2D transmission/reception may be performed on an uplink of band 28 in which the Pcell of the BS operates. However, since a D2D operation in Release 13 currently supports only a simultaneous transmission/reception operation in an inter-band, a D2D operation and a WAN operation in the Pcell is excluded.

As illustrated in FIG. 12c, band 28 may be a band in which a Scell of a cellular BS operates, and band 1 may be a band in which a Pcell of the cellular BS operates. Here, D2D transmission/reception may be performed on an uplink of band 28 in which the Scell of the BS operates.

Here, when a D2D signal is currently transmitted through the Scell, that is, a secondary component carrier (SCC), transmission power for a D2D UE is configured as follows.

Here, only Pmpr,c=0 dB is considered. When Pmpr,c≠0, the value of $P_{Powerclass}$ minus Pmpr,c is the maximum transmission power of the UE.

A. Transmission power configured for D2D UE (or ProSe UE)

Requirements for the configured maximum output power $P_{CMAX,c}$ and a power boundary are defined as follows.
$MPR_c$
$A\text{-}MPR_c$
$\Delta T_{ProSe}=0.1$ dB For $P_{CMAX,PSSCH}$ and $P_{CMAX,PSCCH}$, $P_{EMAX,c}$ is a value provided from serving cell C via P-Max. $P_{EMAX,c}$ is a value provided from a higher layer via maxTXPower when a UE does not operate on a carrier for D2D communication or ProSe communication.

For $P_{CMAX,PSDCH}$, $P_{EMAX,c}$ is a value provided from a higher layer via a discMaxTxPower parameter.

For $P_{CMAX,PSBCH}$, $P_{EMAX,c}$ is a value provided from a higher layer via maxTxPower when a UE does not operate on a carrier for D2D communication or ProSe communication. When the UE does not operate in the serving cell, if PSBCH/SLSS transmission is triggered for direct ProSe communication, PEMAX,c is a value provided from a higher layer via P-Max or a value provided from a higher layer via discMaxTxPower.

$P_{CMAX,SSSS}$ is a value using $P_{CMAX,PSBCH}$, to which an MPR is applied, for SSSS transmission, in order to reduce a PAPR and a cubic metric.

Transmission power configured for WAN communication and D2D communication in different bands (that is, inter-band) may be determined between $P_{CMAX\_L}$ and $P_{CMAX\_H}$ of each serving cell used for two uplink transmission through conventional inter-band CA. On the other hand, when obtained $P_{CMAX\_L}$ is 23 dBm, which is equivalent to power class 3, and P_WAN+P_D2D≥23 dBm in one subframe where WAN transmission and D2D transmission are simultaneously performed, where P_WAN<23 dB, P_WAN is set to configured transmission power and P_D2D is determined to be [$P_{Powerclass}$−P_WAN] (obtained via conversion on a linear scale, equation application, and conversion on a logarithmic scale) or lower. That is, transmission power on each carrier in WAN transmission and WAN transmission is configured to decrease at the same rate in order to meet $P_{Powerclass}$ and is configured such that total power does not exceed the power class. However, since the priority of a WAN needs to be always guaranteed in WAN transmission and D2D transmission, transmission power for cellular communication maintains the same value without being affected by D2D transmission, whereas D2D transmission power is reduced or D2D transmission may not be performed so that the total power does not exceed the power class, which is described in the following example.

When P_WAN is 21 dBm, P_D2D for a UE of power class 3 needs to be 18.67 dBm or lower so that the total power does not exceed 23 dBm. Further, when WAN communication and D2D communication are performed asynchronously, if WAN transmission time is earlier than D2D (that is, WAN transmission leads) or if D2D transmission time is earlier than WAN transmission time (that is, D2D transmission leads), $P_{CMAX}$ needs to be determined based on a subframe n for WAN transmission.

The foregoing details may be properly summarized as follows.

B. Improvement in transmission power configured for D2D UE (or ProSe UE)

Requirements for the configured maximum output power $P_{CMAX,c}$ and a power boundary are defined as follows.
$MPR_c$
$A\text{-}MPR_s$
$\Delta TproSe=0.1$ dB Regarding $P_{CMAX,PSSCH}$ and $P_{CMAX,PSCCH}$, $P_{EMAX,c}$ is a value provided from serving cell C via P-Max. $P_{EMAX,c}$ is a value provided from a higher layer via maxTXPower when a UE does not operate on a carrier for D2D communication or ProSe communication.

Regarding $P_{CMAX,PSDCH}$, $P_{EMAX,c}$ is a value provided from a higher layer via a discMaxTxPower parameter.

Regarding $P_{CMAX,PSBCH}$, $P_{EMAX,c}$ is a value provided from a higher layer via maxTxPower when a UE does not operate on a carrier for D2D communication or ProSe communication. When the UE does not operate in the serving cell, if PSBCH/SLSS transmission is triggered for direct ProSe communication, $P_{EMAX,c}$ is a value provided from a higher layer via P-Max or a value provided from a higher layer via discMaxTxPower.

$P_{CMAX,SSSS}$ is a value using $P_{CMAX,PSBCH}$, to which an MPR is applied for SSSS transmission.

Simultaneous WAN transmission and D2D transmission using one serving cell and inter-band aggregation may be represensted as follows.

$$P_{CMAX\_L} = \text{MIN}\{10\log_{10}\Sigma\text{MIN}[p_{EMAX,c}/(\Delta t_{C,c}),$$
$$p_{PowerClass}/(mpr_c \cdot a - mpr_c \cdot \Delta t_{C,c} \cdot \Delta t_{IB,c} \cdot \Delta T_{ProSe,c}),$$
$$p_{PowerClass}/pmpr_c], P_{PowerClass}\} \quad \text{[Equation 5]}$$

$$P_{CMAX\_H} = \text{MIN}\{10\log_{10}\Sigma p_{EMAX,c}, P_{PowerClass}\} \quad \text{[Equation 6]}$$

When WAN transmission and D2D transmission are synchronously performed using inter-band aggregation, $P_{CMAX,C}$ for WAN transmission is determined and $P_{CMAX,C}$ for D2D transmission is applied.

When WAN transmission and D2D transmission are asynchronously performed using inter-band aggregation, if WAN transmission is performed in a subframe n and D2D transmission is performed in a subframe m, a reference subframe for determining transmission power is always the subframe n for WAN transmission.

Here, when D2D transmission starts ahead of WAN transmission (that is, D2D transmission leads), a pair of (n, m) and (n, m+1) needs to be considered to determine $P_{CMAX}$, that is, to obtain $P_{CMAX\_L}$ and $P_{CMAX\_H}$.

However, when WAN transmission starts ahead of D2D transmission (that is, WAN transmission leads), a pair of (n, m) and (n, m−1) needs to be considered to determine $P_{CMAX}$, that is, to obtain $P_{CMAX\_L}$ and $P_{CMAX\_H}$.

Here, $P_{CMAX\_L}$ and $P_{CMAX\_H}$ are defined as follows.

When D2D transmission starts ahead of WAN transmission (that is, D2D transmission leads), $P_{CMAX\_L}$ and PcmAx H are defined as follows.

$$P_{CMAX\_L} = \text{MIN}\{P_{CMAX\_L}(,n,m), P_{CMAX\_L}(n,m+1)\}$$

$$P_{CMAX\_H} = \text{MAX}\{P_{CMAX\_H}(n,m), P_{CMAX\_H}(n,m+1)\} \quad \text{[Equation 7]}$$

However, when WAN transmission starts ahead of D2D transmission (that is, WAN transmission leads), $P_{CMAX\_L}$ and $P_{CMAX\_H}$ are defined as follows.

$$P_{CMAX\_L} = \text{MIN}\{P_{CMAX\_L}(n,m-1), P_{CMAX\_L}(n,m)\}$$

$$P_{CMAX\_H} = \text{MAX}\{P_{CMAX\_H}(n,m-1), P_{XMAX\_H}(n,m)\} \quad \text{[Equation 8]}$$

When $P_{CMAX,L} = P_{PowerClass}$ and $P_{CMAX,C}$ for WAN transmission <$P_{PowerClass}$, transmission power configured for WAN transmission needs to meet (satisfy) obtained $P_{CMAX,L}$. Transmission power configured for D2D transmission needs to be adjusted not to exceed $P_{PowerClass}$ of a UE in any time interval.

This can be explained considering the following two cases. A first case is where WAN transmission and D2D transmission correspond to inter-band CA and time synchronization between WAN transmission and D2D transmission is achieved to a certain extent (up to 32.47 us). A second case is where WAN transmission and D2D transmission are directed to geographically different destinations (inter-site) and time synchronization therebetween is not achieved. The two cases are referred to as case 1 and case 2. as follows.

Case 1. Time synchronization between WAN transmission and D2D transmission is achieved to a certain extent FIG. 13 illustrates that time synchronization between WAN transmission and D2D transmission s achieved to a certain extent.

In an environment where time synchronization between inter-bands is achieved, D2D transmission using a lower band (e.g., band 28) has wider coverage than WAN transmission using a higher band (e.g., band 1) and thus has a greater timing advance (TA). Therefore, when the time synchronization operates within 32.47 us, WAN transmission time and D2D transmission time are as illustrated in FIG. 13.

Figure 13:
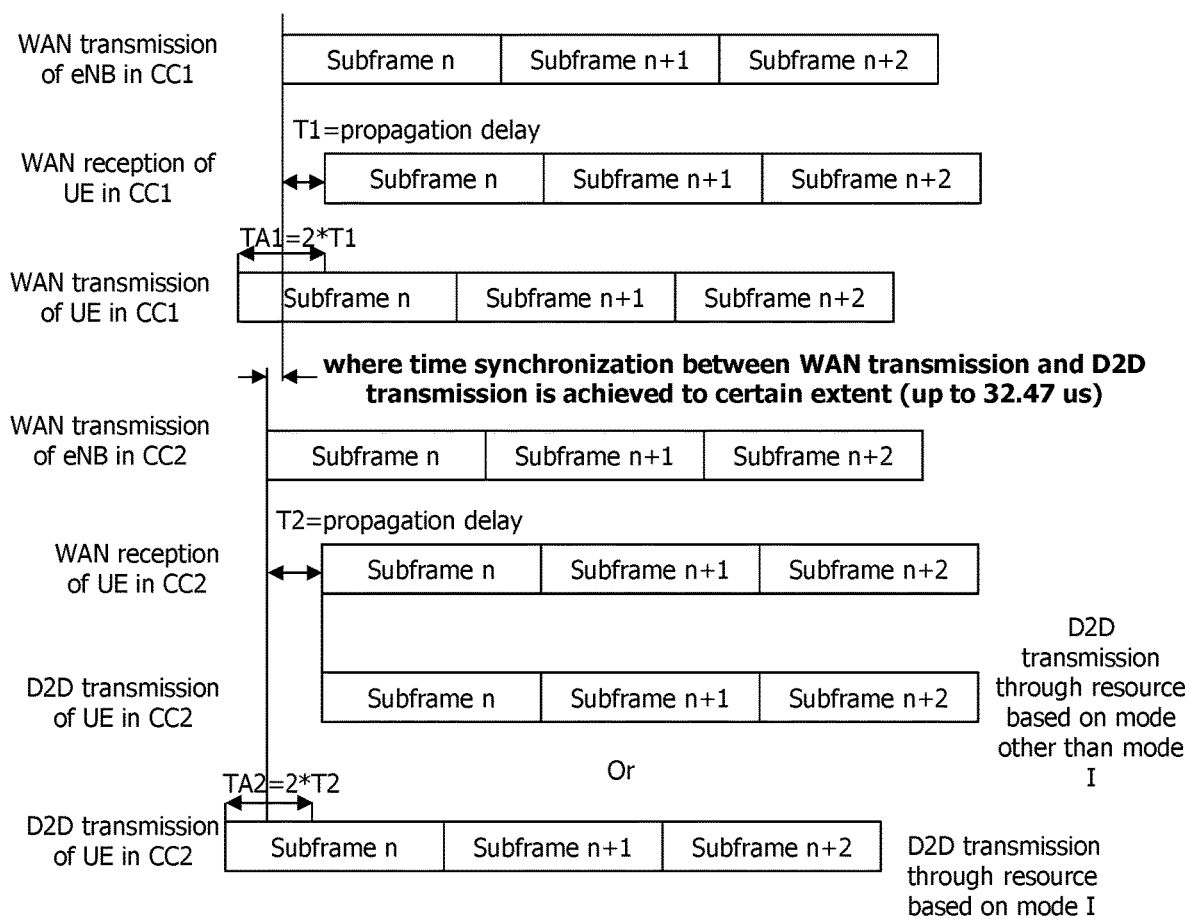
FIG. 13 illustrates that time synchronization between WAN transmission and D2D transmission is achieved to a certain extent.
Figure 14A:
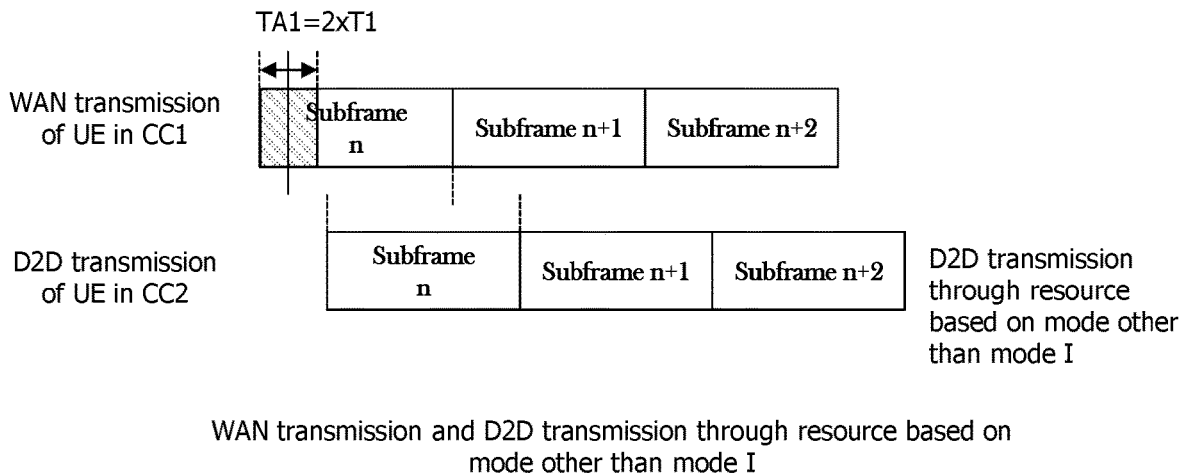
FIG. 14a illustrates subframes for WAN transmission and D2D transmission through a resource based on a mode other than mode I in the synchronous environment of FIG. 13.
Figure 14B:
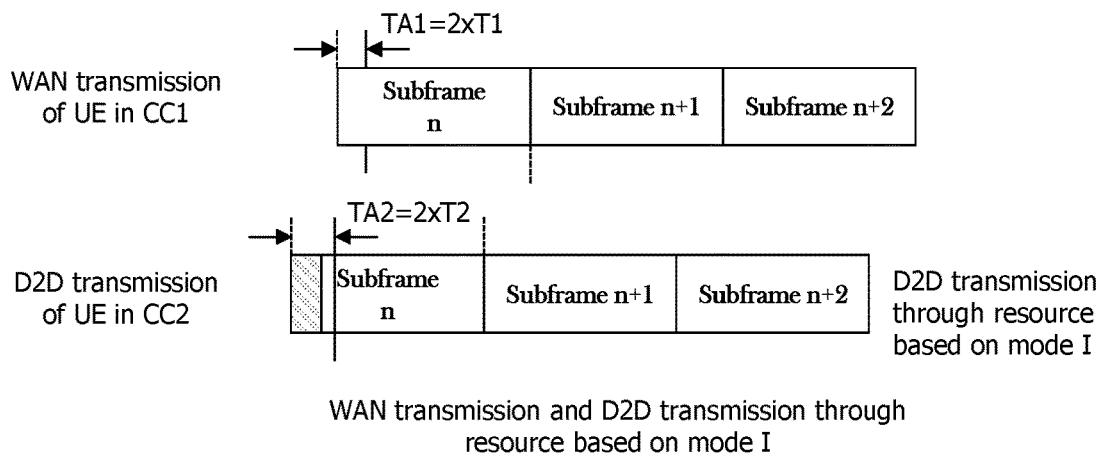
FIG. 14b illustrates subframes for WAN transmission and D2D transmission through a resource based on mode I in the synchronous environment of FIG. 13.

FIG. 14a illustrates subframes for WAN transmission and D2D transmission through a resource based on a mode other than sidelink mode I (when D2D communication is performed using control data from a BS) in the synchronous environment of FIG. 13, and FIG. 14b illustrates subframes for WAN transmission and D2D transmission through a resource based on mode I in the synchronous environment of FIG. 13.

As illustrated in FIG. 14a, when D2D transmission is performed through a resource based on a mode other than mode I (for example, mode II: D2D UE's autonomous RB assignment), D2D transmission time for a UE is determined based on WAN reception time.

A hatched portion in FIG. 14a indicates a period in which D2D transmission (D2D transmission through a resource based on a mode other than mode I) is not performed when the UE performs WAN transmission in CC1. A non-hatched portion indicates a subframe period in which WAN transmission and D2D transmission are simultaneously performed.

On the other hand, as illustrated in FIG. 14b. when D2D transmission is performed through a resource based on mode I, D2D transmission time for the UE is determined based on WAN transmission time for the UE. Therefore, as illustrated in FIG. 14b, D2D transmission may be performed before WAN transmission. Here, the hatched portion indicates a period in which only D2D transmission is performed.

Referring to FIGS. 14a and 14b, even though time synchronization between WAN transmission and D2D transmission is achieved to a certain extent, there may be a period in which only WAN transmission is performed because WAN transmission starts ahead of D2D transmission and there may be a period in which D2D transmission is performed alone because D2D transmission starts ahead of WAN transmission.

Accordingly, when time synchronization between WAN transmission and D2D transmission s achieved to a certain extent, transmission power for the UE may be determined as follows.

$$P_{CMAX\_L} = \text{MIN}\{10\log_{10}\Sigma\text{MIN}[p_{EMAX,c}/(\Delta t_{C,c}),$$
$$p_{PowerClass}/(mpr_c \cdot a - mpr_c \cdot \Delta t_{C,c} \cdot \Delta t_{IB,c} \cdot \Delta T_{ProSe,c}),$$
$$p_{PowerClass}/pmpr_c], P_{PowerClass}\} \quad \text{[Equation 9]}$$

Using the above equation, $P_{CMAX\_L}$ for each subframe is determined, which is the minimum value of total $P_{CMAX,L}$ for individual slots, which is illustrated with reference to a drawing.

FIG. 15 illustrates WAN transmission power per slot for a UE in CC1 and D2D transmission power per slot for the UE in CC2.

As illustrated in FIG. 15, when $P_{CMAX\_L}$ for WAN transmission calculated for slot 1 is 22 dBm, $P_{CMAX\_L}$ for D2D transmission calculated for slot 1 is 20 dBm, $P_{CMAX\_L}$ for WAN transmission calculated for slot 2 is 21 dBm, and $P_{CMAX\_L}$ for D2D transmission calculated for slot 2 is 21 dBm, $P_{CMAX,L}=23$ dBm for slot 1 and $P_{CMAX,L}=23$ dBm for slot 2, and accordingly $P_{CMAX,L}=23$ dBm is finally applied for a subframe.

Here, when WAN transmission and D2D transmission are simultaneously performed, WAN transmission power is maintained to be a total of 21 dBm, and D2D transmission power is adjusted to 18.67 dBm or lower so that the total power does not exceed $P_{Powerclass}$ of 23 dBm.

Case 1-1. D2D transmission time of UE=reception time of UE in the synchronous environment (mode other than mode I)

As illustrated in FIG. 14a, when WAN transmission and D2D transmission do not overlap by about a TA period within a total subframe length of 1 ms, configured transmission power is represented by $P_{CMAX,L}$=MIN{[10*log10 (10^(A/10)+10^(A'/10))], $P_{PowerClass}$}for slot 1 and $P_{CMAX,L}$=MIN{[10*log10(10^(B/10)+10^(B'/10))], $P_{Powerclass}$}for slot 2. A smaller value of these two values is $P_{CMAX,L}$ for a corresponding subframe.

Figure 16:

FIG. 16 illustrates WAN transmission power per slot for a UE in CC1 and D2D transmission power per slot for the UE in CC2 in the situation of FIG. 14a.

As illustrated in FIG. 16, when 10*log10(10^(A/10)+10^(A'/10)) is $P_{Powerclass}$ of 23 dBm or higher in total transmission power for slot 1 and 10*log10 (10^(B/10)+10^(B'/10)) is lower than $P_{Poweclass}$ (23 dBm) in total transmission power for slot 2, $P_{CMAX,L}$ for a corresponding subframe is determined to be 10*log10 (10^(B/10)+10^(B'/10)). Since $P_{CMAX,L}$ applied to the entire subframe does not exceeds 23 dBm, WAN transmission power and D2D transmission power are the same as configured for each carrier (B dBm for WAN transmission and B' dBm D2D transmission).

However, when $P_{CMAX,L}$ per slot exceeds 23 dBm, $P_{CMAX,L}$=$P_{PowerClass}$, which is set to 23 dBm as power class 3 for a UE. For example, when transmission power per slot is as illustrated in FIG. 15, WAN transmission power in CC1 may fixed to 21 dBm, and D2D transmission power in CC2 may be set to 18.67 dBm or lower, thereby satisfying the total power of 23 dBm.

Case 1-2. D2D transmission time=transmission time of UE in the synchronous environment (mode I)

As illustrated in FIG. 14b, when D2D transmission is performed through a resource based on mode 1, D2D transmission time for a LTE is determined based on WAN transmission time for the UE, so that D2D transmission may start before WAN transmission. In this case, transmission power is described as below in FIG. 17.

Figure 17:
FIG. 17 illustrates WAN transmission power per slot for a UE in CC1 and D2D transmission power per slot for the UE in CC2 in the situation of FIG. 14b.

FIG. 17 illustrates WAN transmission power per slot for a UE in CC1 and D2D transmission power per slot for the UE in CC2 in the situation of FIG. 14b.

As illustrated in FIG. 17, when WAN transmission and D2D transmission do not overlap by a certain time period within a subframe length of 1 ms, $P_{CMAX,L}$=MIN {[10*log10 (10^(A/10)+10^(A'/10))], $P_{PowerClass}$} for slot 1 and $P_{CMAX,L}$=MIN{[10*log10 (10^(B/10)+10^(B'/10))], $P_{Powerclass}$} for slot. A smaller value of these two values is $P_{CMAX,L}$ for a corresponding subframe.

When transmission power for slot 1 exceeds $P_{Powerclass}$ and transmission power for slot 2 is lower than $P_{Powerclass}$, $P_{CMAX,L}$ to be applied to the subframe is set to a value lower than 23 dBm, and thus WAN transmission power and D2D transmission power are the same as configured values (B dBm for WAN transmission and B' dBm D2D transmission).

However, when $P_{CMAX,L}$ per slot exceeds 23 dBm, $P_{CMAX,L}$=$P_{PowerClass}$. For example, when transmission power per slot is as illustrated in FIG. 15, WAN transmission power in CC1 may fixed to 21 dBm, and D2D transmission power in CC2 may be set to 18.67 dBm or lower, thereby satisfying the total power of 23 dBm.

The details mentioned so far are summarized as follows.

Figure 18:
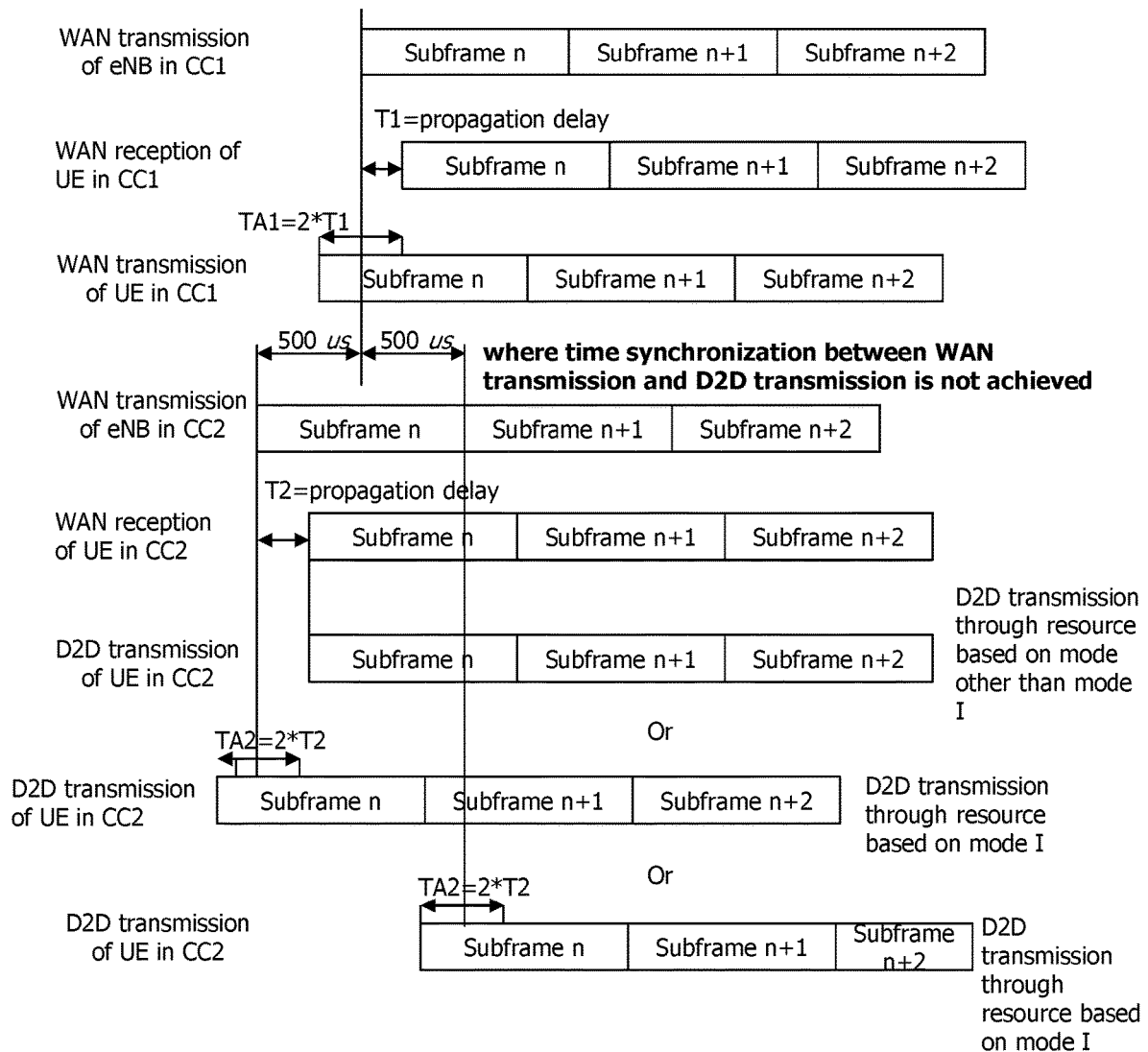
FIG. 18 illustrates that time synchronization between WAN transmission and D2D transmission is not achieved.

In the case where D2D transmission time for a UE is determined based on WAN reception time for the UE or WAN transmission time for the UE in the situation where time synchronization between WAN transmission and D2D transmission is achieved to a certain extent (i) $P_{CMAX,L}$<23 dBm
WAN transmission power=calculated transmission power
D2D transmission power=calculated transmission power
(ii) $P_{CMAX,L}$=23 dBm
When WAN transmission power<23 dBm
WAN transmission power=calculated transmission power D2D transmission power is adjusted not to exceed $P_{Powerclass}$ When WAN transmission power=23 dBm
No D2D transmission is performed
Case 2, Time synchronization between WAN transmission and D2D transmission is not achieved FIG. 18 illustrates that time synchronization between WAN transmission and D2D transmission is not achieved.

FIG. 18 shows times for WAN communication and D2D communication in an asynchronous environment. Specifically, D2D transmission may start ahead of WAN transmission, or WAN transmission may start ahead of D2D transmission.

FIGS. 19a to 19d illustrate examples of WAN transmission time and D2D transmission time in the asynchronous environment of FIG. 18.

Figure 19A:
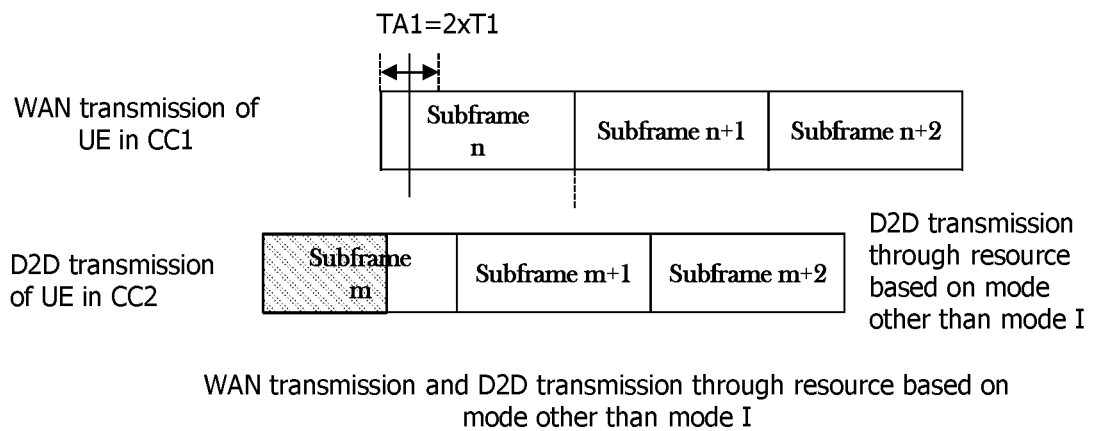
FIGS. 19a to 19d illustrate examples of WAN transmission time and D2D transmission time in the asynchronous environment of FIG. 18.

As illustrated in FIG. 19a, when D2D transmission is performed through a resource based on a mode (e.g., mode II) other than mode I, D2D transmission time for a LTE may lead WAN transmission time for the UE in the asynchronous environment. Therefore, a hatched portion in FIG. 19a indicates a period in which only D2D transmission is performed. A non-hatched portion indicates a subframe period in which WAN transmission and D2D transmission are simultaneously performed.

Figure 19B:
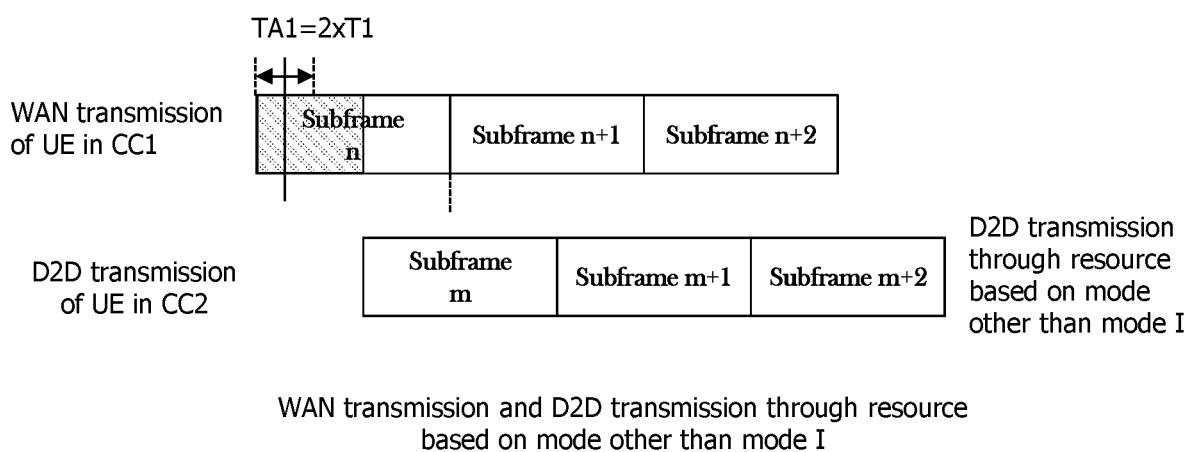

Alternatively, as illustrated in FIG. 19b, when D2D transmission is performed through a resource based on a mode (e.g, mode II) other than mode I, WAN transmission time may lead D2D transmission time for the UE in the asynchronous environment. Here, a hatched portion indicates a period in which only WAN transmission is performed.

Figure 19C:
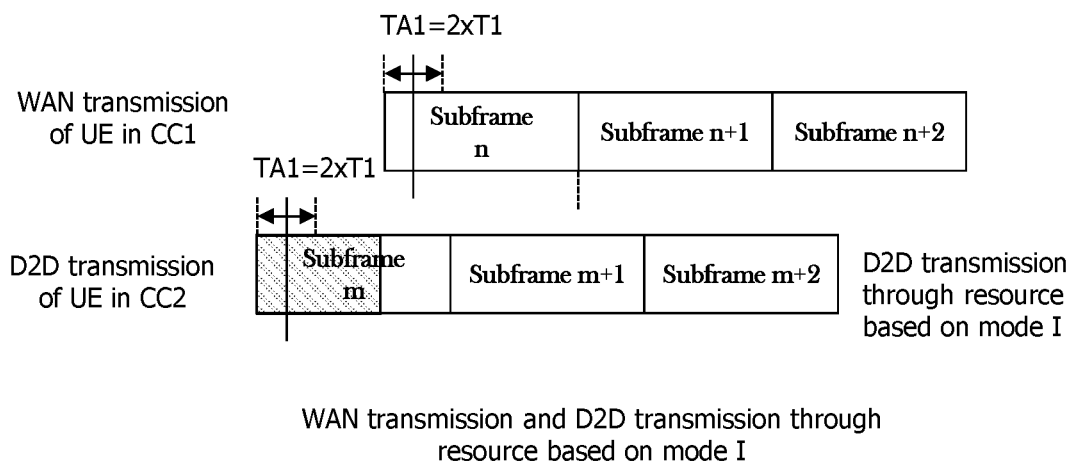

As illustrated in FIG. 19c, when D2D transmission is performed through a resource based on mode 1, D2D transmission time for the UE may lead WAN transmission time for the LTE in the asynchronous environment. Here, a hatched portion indicates a period in which only D2D transmission is performed.

Figure 19D:
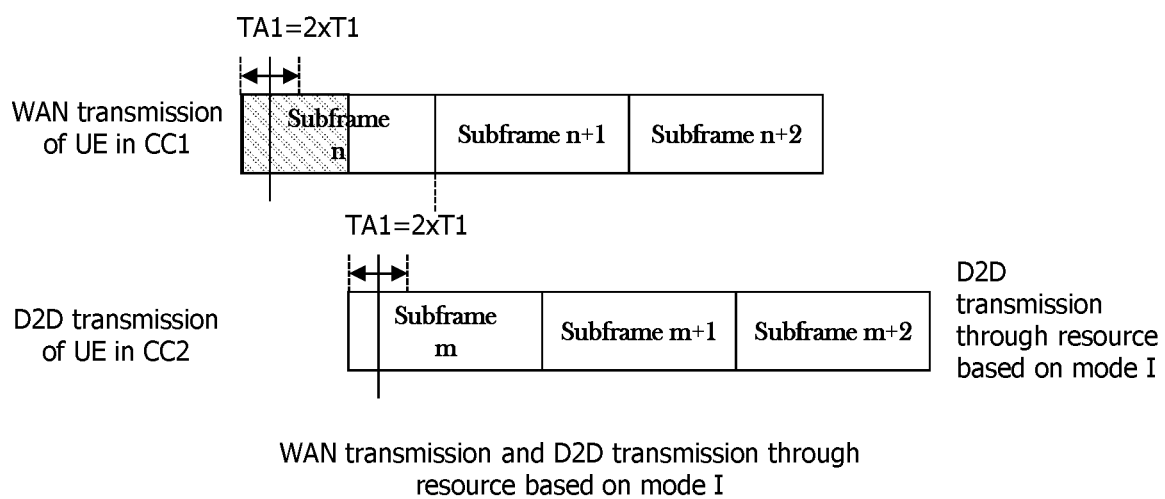

Alternatively, as illustrated in FIG. 19d, when the D2D transmission is performed through a resource based on mode I, WAN transmission time may lead D2D transmission time in the asynchronous environment. Here, a hatched portion indicates a period in which only WAN transmission is performed.

As illustrated in FIGS. 19a to 19d, in the environment where time synchronization between WAN transmission and D2D transmission is not achieved, transmission power configured for a UE needs to be determined based on which transmission should be performed first.

A method for determining transmission power configured for a UE may be as follows.

Case 2-1. When D2D transmission time for a UE leads WAN transmission time for the UE in an asynchronous environment.

In the asynchronous environment illustrated in FIG. 18, WAN transmission time and D2D transmission time may not coincide with each other by up to 500 us (that is, the time length of one slot). This is similar to in a dual-connectivity environment. Therefore, when the times do not coincide by up to one-slot time, $P_{CMAX,L}$ cannot be compared between adjacent slots as in a synchronous system.

Figure 20:
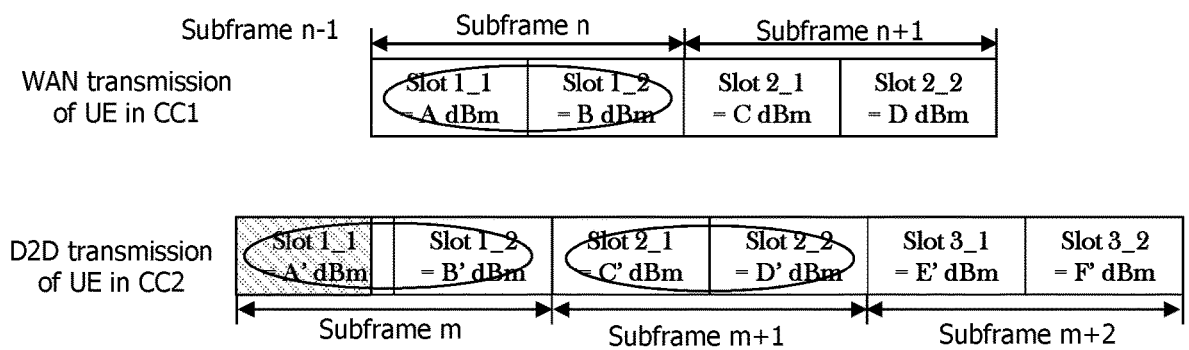
FIG. 20 illustrates transmission power per slot in the case where D2D transmission time leads WAN transmission time in the asynchronous environment of FIG. 18.

FIG. 20 illustrates transmission power per slot in the case where D2D transmission time leads WAN transmission time in the asynchronous environment of FIG. 18.

A hatched portion in FIG. 20 indicates a period in which only D2D transmission is performed. A non-hatched portion indicates a period in which WAN transmission and D2D transmission are simultaneously performed. For a subframe in which WAN transmission and D2D transmission are simultaneously performed, $P_{CMAX\_L}$ for each transmission is obtained, among which a minimum value may be selected. Particularly, unlike in dual connectivity, when WAN transmission and D2D transmission are simultaneously performed in the asynchronous environment, both subframes m and m+1 for D2D transmission are affected by a subframe n for WAN transmission. Further, subframes n−1 and n for WAN transmission are not affected by the subframe m for D2D transmission, and WAN transmission power on the subframes may be maintained as it is. That is, transmission power on a subframe for D2D transmission depends on WAN transmission power and is entirely influenced by $P_{CMAX\_L}$ obtained for a subframe for each WAN transmission.

Specifically, referring to FIG. 20, a UE first calculates $P_{CMAX\_L}$ for the subframes m and m+1 where WAN transmission and D2D transmission are simultaneously performed in order to obtain WAN transt ission power for the subframe n. That is, the UE calculates $P_{CMAX\_L}$ (n,m) for the subframe n for WAN transmission and for the subframe m for D2D transmission. Further, the UE calculates $P_{CMAX\_L}$ (n,m+1) for the subframe n for WAN transmissionand for the subframe m+1 for D2D transmission and selects a minimum value from among the obtained values as $P_{CMAX\_L}$.

For example, when $P_{CMAX\_L}$ for WAN transmission has slot 1_1=20 dBm and slot 1_2=21 dBm and $P_{CMAX\_L}$ for D2D transmission has slot 1_1=19 dBm, slot 1_2=19 dBm, slot 2_1=20 dBm, and slot 2_2=21 dBm, $P_{CMAX\_L}$ (n, m)=22.54 dBm and $P_{CMAX\_L}$ (n, m+1)=23 dBm.

Since $P_{CMAX\_L}$=MIN{$P_{CMAX\_L}$(n,m), $P_{CMAX\_L}$(n,m+1)} for the subframe n for WAN transmission, the transmission power is finally set to 22.54 dBm. That is, the transmission power configured for the subframe n for WAN transmission is 20 dBm, and transmission power for the subframes m and m+1 for D2D transmission needs to be determine so as not to affect the transmission power configured for WAN transmission. Accordingly, $P_{CMAX\_L}$ for the subframe m+1 is limited to up to 20 dBm (that is, adjusted such that the subframe m+1 for D2D transmission 20 dBm).

$P_{CMAX\_L}$ for a subframe n+1 for next WAN transmission may be obtained as follows. When $P_{CMAX\_L}$ for WAN transmission has slot 2_1=21 dBm and slot 2_2=22 dBm and $P_{CMAX\_L}$ for D2D transmission has slot 2_1=20 dBm, slot 2_2=20 dBm, slot 3_1=21 dBm, and slot 3_2=22 dBm, $P_{CMAX\_L}$(n+1,m+1)=23 dBm and $P_{CMAX\_L}$(n+1,m+2)=23 dBm. Since $P_{CMAX\_L}$=MIN{$P_{CMAX\_L}$(n+1,m+1), $P_{CMAX\_L}$(n+1,m+2)} for the subframe n+1 for WAN transmission, the transmission power is finally set to 23 dBm. In this case, since WAN transmission power should also not be affected by D2D transmission, the transmission power for the subframe n+1 is set to 21 dBm, and $P_{CMAX\_L}$ for D2D subframes m+1 and m+2 is limited to up to 18.67 dBm (that is, adjusted such that D2D transmission subframe m+1≤18.67 dBm and D2D transmission subframe m+2≤18.67 dBm).

As described above, only $P_{CMAX\_L}$ for a WAN transmission subframe is obtained and is applied to D2D transmission, thereby calculating total transmission power.

Case 2-2. When WAN transmission time for a UE leads D2D transmission time for the UE in an asynchronous environment When WAN Tx leads D2D Tx in the asynchronous environment, $P_{CMAX\_L}$ may be obtained using $P_{CMAX\_L}$=MIN{$P_{CMAX\_L}$(n,m−1), $P_{CMAX\_L}$ (n,m)} and transmission power for D2D subframes m−1 and m may be obtained depending on $P_{CMAX\_L}$. When there is no D2D signal in a subframe m−1, $P_{CMAX\_L}$=$P_{CMAX\_L}$(n,m).

Figure 21:
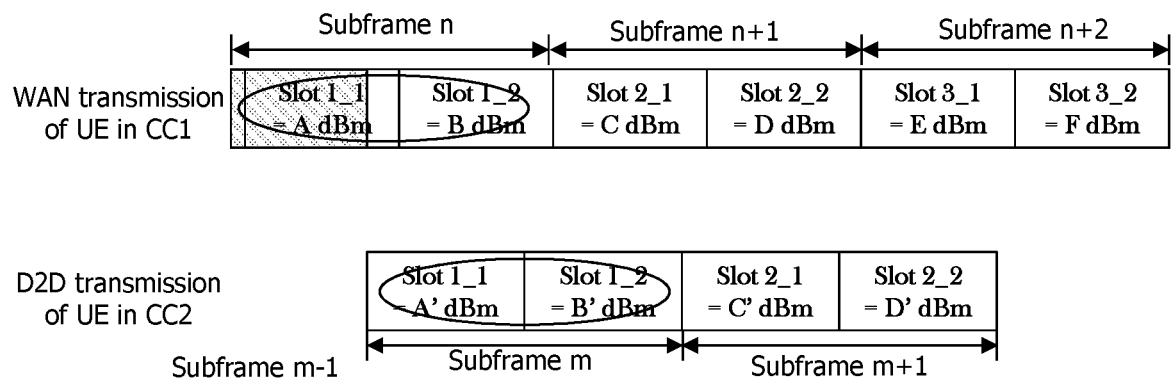
FIG. 21 illustrates transmission power per slot in the case where WAN transmission time leads D2D transmission time in the asynchronous environment of FIG. 18.

FIG. 21 illustrates transmission power per slot in the case where WAN transmission time leads D2D transmission time in the asynchronous environment of FIG. 18.

A hatched portion in FIG. 21 indicates a period in which only WAN transmission is performed. A non-hatched portion indicates a period in which WAN transmission and D2D transmission are simultaneously performed. For a subframe in which WAN transmission and D2D transmission are simultaneously performed, $P_{CMAX\_L}$ for each transmission is obtained, among which a minimum value may be selected.

For example, when $P_{CMAX\_L}$ for WAN transmission has slot 1_1=20 dBm and slot 1_2=21 dBm and $P_{CMAX\_L}$ for D2D transmission has slot 1_1=20 dBm, slot 1_2=20 dBm, slot 2_1=21 dBm, and slot 2_2=22 dBm, since no D2D transmission is performed via the subframe m−1, $P_{CMAX\_L}$ for a subframe n may be determined using only $P_{CMAX\_L}$ (n,m). This value is 23 dBm, and accordingly transmission power configured for the subframe n for WAN transmission is determined to be 20 dBm and transmission power for the subframe m for D2D transmission needs to be determined so as not to affect the configured transmission power. Thus, D2D transmission power $P_{CMAX\_L}$ for the subframe m is limited to up to 20 dBm.

$P_{CMAX\_L}$ for a subframe n+1 for next WAN transmission may be obtained as follows. When $P_{CMAX\_L}$ for WAN transmission has slot 2_1=21 dBm and slot 2_2=22 dBm and $P_{CMAX\_L}$ for D2D transmission has slot 1_1=20 dBm, slot 1_2=20 dBm, slot 2_1=21 dBm, and slot 2_2=22 dBm, $P_{CMAX\_L}$ (n+1,m)=23 dBm and $P_{CMAX\_L}$(n+1,m+1)=23 dBm. Therefore, since $P_{CMAX\_L}$=MIN{$P_{CMAX\_L}$(n+1,m), $P_{CMAX\_L}$(n+1,m+1)} for the subframe n+1, transmission power for the subframe n+1 for WAN transmission is set to 23 dBm. In this case, since WAN transmission power should also not be affected by D2D transmission, the transmission power for the subframe n+1 is set to 21 dBm, and $P_{CMAX\_L}$ for D2D transmission subframes m and m+1 is limited to up to 18.67 dBm (that is, adjusted such that D2D subframe m≤18.67 dBm and D2D subframe m+1≤18.67 dBm).

The details mentioned so far are summarized as follows.

In an environment where time synchronization between WAN transmission and D2D transmission is not achieved (that is, an asynchronous environment), (A) When D2D transmission time leads WAN transmission time (A-i) $P_{CMAX\_L}$=MIN{$P_{CMAX\_L}$(n,m), $P_{CMAX\_L}$(n,m+1)}<23 dBm WAN transmission power=calculated transmission power (minimum $P_{CMAX\_L}$ per slot)

D2D transmission power for subframes m and m+1 needs to be adjusted not to exceed $P_{Powerclass}$ (A-ii) $P_{CMAX\_L}$=MIN{$P_{CMAX\_L}$(n,m), $P_{CMAX\_L}$(n,m+1)}=23 dBm When WAN transmission power<23 dBm WAN transmission power=calculated transmission power (minimum $P_{CMAX\_L}$ per slot)

D2D transmission power needs to be adjusted not to exceed $P_{Powerclass}$

When WAN transmission power =23 dBm

No D2D transmission is performed (B) When WAN transmission time leads D2D transmission time (B-i) $P_{CMAX\_L}$=MIN{$P_{CMAX\_L}$ (n,m−1), $P_{CMAX\_L}$ (n,m)}<23 dBm WAN transmission power=calculated transmission power (minimum $P_{CMAX\_L}$ per slot)

D2D transmission power for subframes m and m+1 needs to be adjusted not to exceed $P_{Powerclass}$ (B-i) $P_{CMAX\_L}$=MIN{$P_{CMAX\_L}$ (n,m−1), $P_{CMAX\_L}$ (n,m)}=23 dBm When WAN transmission power<23 dBm WAN transmission power=calculated transmission power (minimum $P_{CMAX\_L}$ per slot)

D2D transmission power needs to be adjusted not to exceed $P_{Powerclass}$

When WAN transmission power=23 dBm

No D2D transmission is performed

The aforementioned embodiments of the present invention can be implemented through various means. For example, the embodiments of the present invention can be implemented in hardware, firmware, software, combination of them, etc. Details thereof will be described with reference to the drawing.

Figure 22:
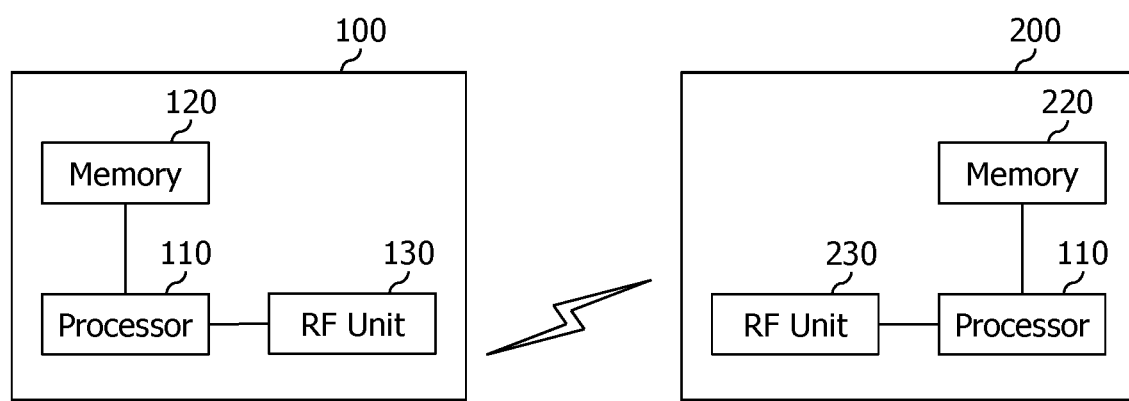
FIG. 22 is a block diagram illustrating a wireless communication system to implement the present disclosure.

FIG. 22 is a block diagram illustrating a wireless communication system to implement the present disclosure.

ABS 200 includes a processor 210, a memory 220, and a radio frequency (RF) unit 230. The memory 220 is coupled to the processor 210, and stores various pieces of information for driving the processor 210. The RF unit 230 is coupled to the processor 210, and transmits and/or receives a radio signal. The processor 210 implements the proposed functions, procedures, and/or methods. In the aforementioned embodiment, an operation of the BS may be implemented by the processor 210.

A UE 100 includes a processor 110, a memory 120, and an RF unit 130. The memory 120 is coupled to the processor 110, and stores various pieces of information for driving the processor 110. The RF unit 130 is coupled to the processor 110, and transmits and/or receives a radio signal. The processor 110 implements the proposed functions, procedures, and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A transmission method performed by a device and comprising:

transmitting, by the device, a cellular uplink signal and a proximity service (ProSe) signal based on a total transmission power PCMAX, wherein the total transmission power PCMAX satisfies PCMAX_L≤PCMAX≤PCMAX_H, where PCMAX_L is a lower bound and PCMAX_H is an upper bound, wherein, based on (i) that the cellular uplink signal is transmitted on subframe n, (ii) that the ProSe signal is transmitted on subframe m, and (iii) that the subframe n is asynchronous with the subframe m, the subframe n is taken as a reference, wherein based on (iv) that the transmission of the uplink signal leads the transmission of the ProSe signal, the upper bound PCMAX_H is determined in consideration of subframe pairs of (n, m) and (n, m−1).

2. The method of claim 1, wherein the upper bound PCMAX_H is determined by a following equation:

PCMAX_H=MAX {PCMAX_H(n,m−1), PCMAX_H (n,m)}.

3. The method of claim 1, wherein the cellular uplink signal is transmitted to a base station and the ProSe signal is transmitted to an adjacent other device.

4. The method of claim 1, wherein a carrier for transmitting the cellular uplink signal is different from a carrier for transmitting the ProSe signal.

5. The method of claim 1, wherein a carrier for transmitting the cellular uplink signal and a carrier for transmitting the ProSe signal relate to an inter-band carrier aggregation.

6. A device comprising:

a transceiver; and a processor configured to:

control the transceiver to transmit a cellular uplink signal and a proximity service (ProSe) signal based on a total transmission power PCMAX, wherein the total transmission power PCMAX satisfies PCMAX_L≤PCMAX≤PCMAX_H, where PCMAX_L is a lower bound and PCMAX_H is an upper bound, wherein, based on (i) that the cellular uplink signal is transmitted on subframe n, (ii) that the ProSe signal is transmitted on subframe m, and (iii) that the subframe n is asynchronous with the subframe m, the subframe n is taken as a reference, wherein based on (iv) that the transmission of the uplink signal leads the transmission of the ProSe signal, the upper bound PCMAX_H is determined in consideration of subframe pairs of (n, m) and (n, m−1).

7. The device of claim 6, wherein the upper bound PCMAX_H is determined by a following equation:

PCMAX_H=MAX {PCMAX_H(n,m−1), PCMAX_H (n,m)}.

8. The device of claim 6, wherein the cellular uplink signal is transmitted to a base station and the ProSe signal is transmitted to an adjacent other device.

9. The device of claim 6, wherein a carrier for transmitting the cellular uplink signal is different from a carrier for transmitting the ProSe signal.

10. The device of claim 6, wherein a carrier for transmitting the cellular uplink signal and a carrier for transmitting the ProSe signal relate to an inter-band carrier aggregation.

\* \* \* \* \*